US012593253B2

(12) United States Patent
Damnjanovic et al.

(10) Patent No.:  US 12,593,253 B2
(45) Date of Patent:     Mar. 31, 2026

(54) INDICATING UE-TRIGGERED MOBILITY USING LOW-LAYER INFORMATION

(71) Applicant: QUALCOMM Incorporated, San Diego, CA (US)

(72) Inventors: Jelena Damnjanovic, Del Mar, CA (US); Tao Luo, San Diego, CA (US); Naeem Akl, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 342 days.

(21) Appl. No.: 18/326,892

(22) Filed: May 31, 2023

(65) Prior Publication Data

US 2024/0406812 A1     Dec. 5, 2024

(51) Int. Cl.
H04W 4/00        (2018.01)
H04W 36/00       (2009.01)
H04W 36/36       (2009.01)

(52) U.S. Cl.
CPC ..... H04W 36/0061 (2013.01); H04W 36/362 (2023.05)

(58) Field of Classification Search
CPC ........................ H04W 36/0061; H04W 36/362
See application file for complete search history.

(56) References Cited

U.S. PATENT DOCUMENTS

| | | | | |
|---|---|---|---|---|
| 2019/0223073 A1* | 7/2019 | Chen | ................ | H04W 36/0077 |
| 2020/0344649 A1* | 10/2020 | Xu | ........................ | H04W 36/38 |
| 2022/0014997 A1* | 1/2022 | Zhou | ................ | H04W 74/0833 |
| 2023/0262818 A1* | 8/2023 | Kim | ...................... | H04W 76/19 |
| | | | | 370/328 |
| 2023/0388871 A1* | 11/2023 | Guo | .................. | H04W 36/0069 |
| 2024/0172306 A1* | 5/2024 | Wallentin | .......... | H04W 28/0278 |

(Continued)

FOREIGN PATENT DOCUMENTS

| | | |
|---|---|---|
| WO | 2019215666 A1 | 11/2019 |
| WO | 2023137692 A1 | 7/2023 |

OTHER PUBLICATIONS

3GPP: "3rd Generation Partnership Project, Technical Specification Group Radio Access Network, NR, Medium Access Control (MAC) Protocol Specification (Release 17)", 3GPP TS 38.321 V17.6.0, Sep. 2023, pp. 1-251.

(Continued)

*Primary Examiner* — Abdelnabi O Musa

(74) *Attorney, Agent, or Firm* — Paul M. McAdams; Shumaker & Sieffert, P.A.

(57)                ABSTRACT

An example first network entity for wireless communication includes a communication interface; and one or more processors coupled to the communication interface, wherein the one or more processors are configured to: send, via the communication interface, configuration information to a second network entity, the configuration information specifying a condition to switch from a current cell to a target cell; exchange, via the communication interface, first information of a communication session with the second network entity on the current cell; receive, from the second network entity via the communication interface, switch information representing that the condition has been met; and exchange, via the communication interface, second information with the second network entity on the target cell via the communication session.

26 Claims, 8 Drawing Sheets

(56)                    References Cited

U.S. PATENT DOCUMENTS

| | | | |
|---|---|---|---|
| 2024/0284284 A1* | 8/2024 | Jin | H04W 36/08 |
| 2024/0306051 A1* | 9/2024 | Lin | H04W 36/0072 |
| 2024/0406808 A1 | 12/2024 | Damnjanovic et al. | |
| 2025/0048446 A1* | 2/2025 | Laddu | H04W 52/50 |
| 2025/0081052 A1* | 3/2025 | Chandrashekar | H04W 36/08 |

OTHER PUBLICATIONS

3GPP: "3rd Generation Partnership Project, Technical Specification Group Radio Access Network, NR, Physical Layer Procedures for Data (Release 18)", 3GPP TS 38.214 V18.0.0, Sep. 2023, pp. 1-278.

China Telecom: "Consideration on Support of L1/L2 Based Inter-Cell Mobility", 3GPP TSG RAN WG3#117-e, R3-224393, 3rd Generation Partnership Project, Mobile Competence Centre, 650, Route Des Lucioles, F-06921 Sophia-Antipolis Cedex, France, vol. RAN WG3, No. Online, Aug. 15, 2022-Aug. 24, 2022, Aug. 9, 2022, 4 Pages, XP052264560, p. 2-p. 4.

Huawei, et al., "Solutions for L1/L2 Mobility", 3GPP TSG-RAN2 Meeting #119-e, R2-2207738, 3rd Generation Partnership Project, Mobile Competence Centre, 650, Route Des Lucioles, F-06921 Sophia-Antipolis Cedex, France, vol. RAN WG2, No. Electronic meeting, Aug. 17, 2022-Aug. 29, 2022, Aug. 10, 2022, 7 Pages, XP052261056, p. 5-p. 7.

International Search Report and Written Opinion—PCT/US2024/030008—ISA/EPO—Sep. 12, 2024.

Zhou Y (Zte)., et al., "TP for LTM BL CR to TS 38.401 and 38.473", 3GPP TSG-RAN WG3 #118, R3-226636, Type Discussion, NR_MOB_ENH2-CORE, 3rd Generation Partnership Project, Mobile Competence Centre, 650, Route Des Lucioles, F-06921 Sophia-Antipolis Cedex, France, vol. 3GPP RAN 3, No. Toulouse, FR, Nov. 14, 2022-Nov. 18, 2022, Nov. 4, 2022, 57 Pages, XP052224119, p. 4-p. 7.

Zou J (Futurewei)., et al., "Configuration for Measurement and RACH-less in Sequential LTM", 3GPP TSG-RAN WG2 Meeting #122, R2-2304882, Type Discussion, NR_MOB_ENH2-CORE, 3rd Generation Partnership Project, Mobile Competence Centre, 650, Route Des Lucioles, F-06921 Sophia-Antipolis Cedex, France, vol. 3GPP RAN 2, No. Incheon, KR, May 22, 2003-May 26, 2023, May 12, 2023, 7 Pages, XP052314110, the whole document.

* cited by examiner

INDICATING UE-TRIGGERED MOBILITY USING LOW-LAYER INFORMATION

TECHNICAL FIELD

This disclosure relates to wireless communication systems.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. Some wireless communications systems, such as 4G and 5G systems, may support channel state information (CSI) operations and may also support discontinuous reception (DRX) operations.

As the demand for mobile broadband access continues to increase, research and development continue to advance wireless communication technologies not only to meet the growing demand for mobile broadband access, but to advance and enhance the user experience with mobile communications.

SUMMARY

In general, this disclosure describes techniques related to user equipment (UE) initiated handoff between cells or cell groups of a radio access network (RAN). In particular, the UE may perform a layer 1 or layer 2 triggered mobility (LTM) dynamic switch based on switch configuration information received from a base station.

In one example, a first network entity (e.g., a base station) for wireless communication includes: a communication interface; and one or more processors coupled to the communication interface, wherein the one or more processors are configured to: send, via the communication interface, configuration information to a second network entity, the configuration information specifying a condition to switch from a current cell to a target cell; exchange, via the communication interface, first information of a communication session with the second network entity on the current cell; receive, from the second network entity via the communication interface, switch information representing that the condition has been met; and exchange, via the communication interface, second information with the second network entity on the target cell via the communication session.

In another example, a first network entity (e.g., a user equipment (UE)) for wireless communication includes: a communication interface; and one or more processors coupled to the communication interface, wherein the one or more processors are configured to: receive, via the communication interface, configuration information from a second network entity, the configuration information specifying a condition to switch from a current cell to a target cell; exchange first information with the second network entity in the current cell via a communication session with the second network entity; in response to the condition being met: send, to the second network entity, switch information representing that the condition has been met; and exchange second information with the second network entity in the target cell via the communication session.

In another example, a first network entity (e.g., a base station) for wireless communication includes: a communication interface; and one or more processors coupled to the communication interface, wherein the one or more processors are configured to: send, via the communication interface, configuration information to a second network entity, the configuration information indicating a condition to switch from a current cell to a target cell; exchange first information with the second network entity on the current cell via a communication session with the second network entity; receive, from the second network entity via the communication interface, switch information indicating that the second network entity will switch from the current cell to the target cell based on the condition; send, via the communication interface, confirmation information to the second network entity, the confirmation information confirming that the second network entity will switch from the current cell to the target cell; and exchange, via the communication interface, second information of the communication session with the second network entity on the target cell.

In another example, a first network entity (e.g., a user equipment (UE)) for wireless communication includes: a communication interface; and one or more processors coupled to the communication interface, wherein the one or more processors are configured to: receive, via the communication interface, configuration information from a second network entity, the configuration information specifying a condition to switch from a current cell to a target cell; exchange, via the communication interface, first information of a communication session with the second network entity on the current cell; in response to the condition being met: send, to the second network entity via the communication interface, switch information indicating that the first network entity will switch from the current cell to the target cell; receive, from the second network entity via the communication interface, confirmation information confirming the switch; and exchange, via the communication interface, second information of the communication session with the second network entity on the target cell.

The details of one or more examples are set forth in the accompanying drawings and the description below. Other features, objects, and advantages will be apparent from the description, drawings, and claims.

DETAILED DESCRIPTION

Figure 1:
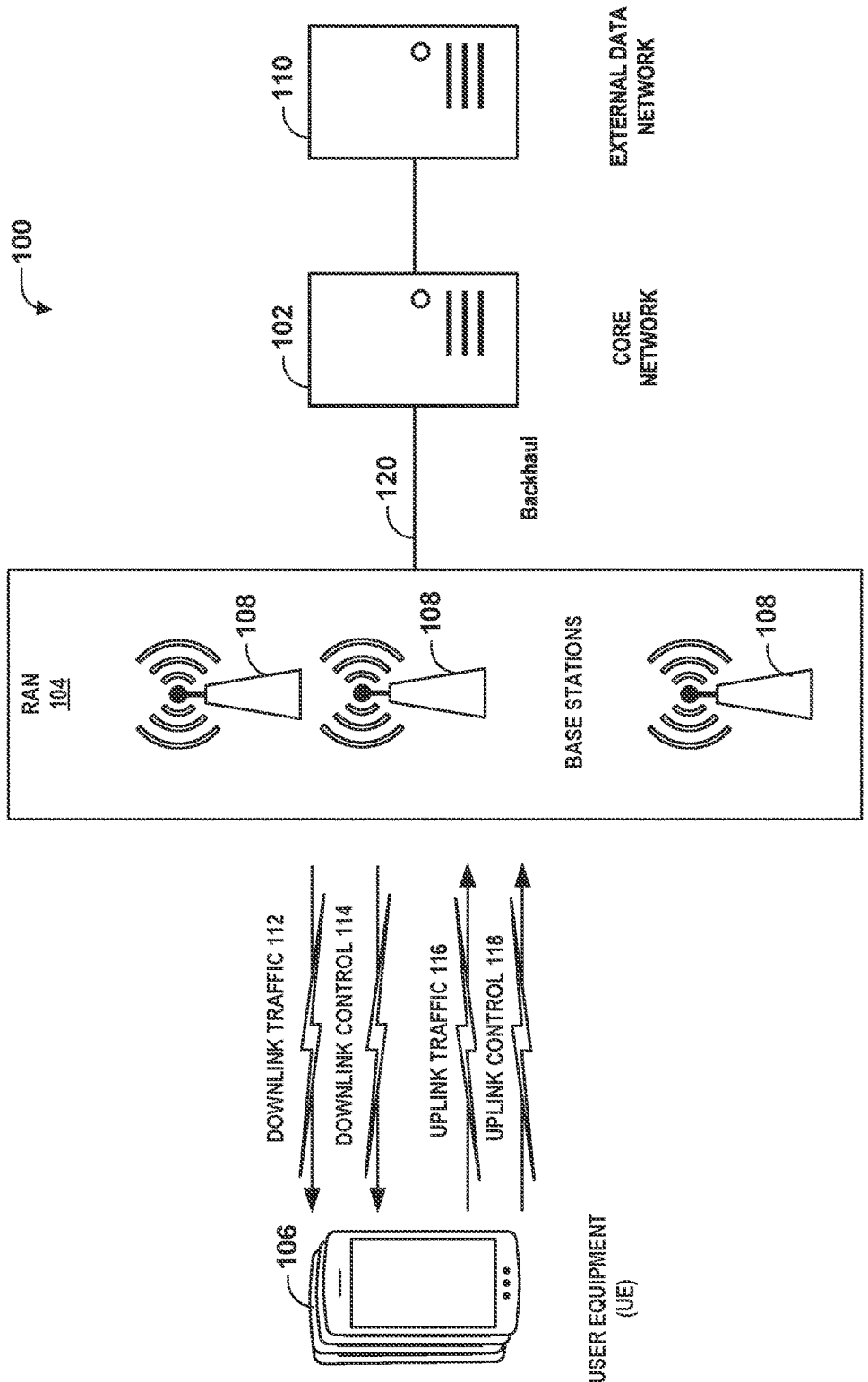
FIG. 1 is a schematic illustration of a wireless communication system according to some aspects of this disclosure.

Wireless communications systems may include multiple communication devices such as user equipment (UEs) and base stations (e.g., network entities), which may provide wireless communication services to the UEs. For example, such base stations may be next-generation NodeBs or giga-NodeBs (either of which may be referred to as a gNB) that may support multiple radio access technologies (RATs) including fourth generation (4G) systems, such as Long Term Evolution (LTE) systems, as well as fifth generation (5G) systems, which may be referred to as New Radio (NR) systems. Some UEs may support reference signal transmission, reception, and reporting.

As described herein, a node (which may be referred to as a node, a network node, a network entity, or a wireless node) may include, be, or be included in (e.g., be a component of) a base station (e.g., any base station described herein), a UE (e.g., any UE described herein), a network controller, an apparatus, a device, a computing system, an integrated access and backhauling (IAB) node, a distributed unit (DU), a central unit (CU), a remote/radio unit (RU) (which may also be referred to as a remote radio unit (RRU)), and/or another processing entity configured to perform any of the techniques described herein. For example, a network node may be a UE. As another example, a network node may be a base station or network entity. As another example, a first network node may be configured to communicate with a second network node or a third network node.

In one aspect of this example, the first network node may be a UE, the second network node may be a base station, and the third network node may be a UE. In another aspect of this example, the first network node may be a UE, the second network node may be a base station, and the third network node may be a base station. In yet other aspects of this example, the first, second, and third network nodes may be different relative to these examples. Similarly, reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node.

Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE is configured to receive information from a base station also discloses that a first network node is configured to receive information from a second network node, the first network node may refer to a first UE, a first base station, a first apparatus, a first device, a first computing system, a first set of one or more one or more components, a first processing entity, or the like configured to receive the information; and the second network node may refer to a second UE, a second base station, a second apparatus, a second device, a second computing system, a second set of one or more components, a second processing entity, or the like.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this example and consistent with this disclosure, disclosure that the first network node is configured to transmit information to the second network node includes disclosure that the first network node is configured to provide, send, output, communicate, or transmit information to the second network node. Similarly, in this example and consistent with this disclosure, disclosure that the first network node is configured to transmit information to the second network node includes disclosure that the second network node is configured to receive, obtain, or decode the information that is provided, sent, output, communicated, or transmitted by the first network node.

In general, in a radio access network, a user equipment (UE) (or other first network entity) may communicate with a base station (e.g., a gNode-B, or other second network entity) to establish a communication session. The base station may provide multiple cells or cell groups with which the UE may communicate with the base station. The UE may be a mobile device, such as a cellular telephone/smartphone. Thus, while moving, a handover between cells or between base stations may occur, where a communication session may be transferred from one cell to another, and the cells may be provided by the same or different base stations.

In some cases, such handover is triggered by layer 3 (L3) communications, where "layer 3" refers to the network layer of the OSI model of computer networks. However, handover can be performed faster when triggered by lower layer, e.g., layer 1 (physical layer) or layer 2 (media access control, MAC) layer communication. MAC control element (MAC CE) is an example data structure carrying control information that a base station may send to a UE to cause the UE to perform a handover from one cell to another.

According to the techniques of this disclosure, a UE may itself initiate a handover from once cell to another. For example, a base station may configure the UE with a set of configuration information specifying one or more conditions to switch from a current cell to a target cell. The UE may then communicate with the base station (or via the base station and with another peer UE) using a communication session in the current cell. After determining that one or more of the conditions have been met, the UE may send layer 1 and/or layer 2 data to indicate that the UE will be transferring to the target cell, thereby indicating that the one or more conditions have been met. For example, the UE may send such information to the current cell and/or the target cell. In response, the base station may send confirmation of the switch to the UE. For example, the base station may send the confirmation to the UE via the current cell and/or the target cell. Such switching initiated by the UE or other such network node/entity may be referred to herein as "L1/L2 triggered mobility," or LTM.

This disclosure describes various techniques related to mechanisms and procedures for L1/L2-based inter-cell mobility for mobility latency reduction. These techniques include configuring and maintaining multiple candidate cells to allow fast application of configurations for candidate cells. These techniques also include a dynamic switch mechanism among candidate serving cells (including a special cell (SpCell) and/or a secondary scell (SCell)) for potential applicable scenarios based on L1/L2 signaling. This disclosure describes L1 enhancements for inter-cell beam management, including L1 measurement and reporting, and beam indication. This disclosure also describes timing advance management and control unit (CU)-distributed unit (DU) interface signaling that may support L1/L2 mobility.

L1/L2-based inter-cell mobility may apply to various scenarios, such as a standalone, carrier aggregation (CA), or new radio dual connectivity (NR-DC) with a serving cell change may occur within one cell group (CG). In another example, intra-DU or intra-CU inter-DU mobility may be performed, such that no new radio access network (RAN) interfaces may be needed. These techniques may also apply when moving intra-frequency and/or inter-frequency, both FR1 and FR2, and the source and target cells may be synchronized or non-synchronized.

FIG. 1 is a block diagram illustrating an example wireless communication system 100 that may be configured to perform techniques of this disclosure. Wireless communication system 100 includes several interacting domains: core network 102, radio access network (RAN) 104, and user equipment (UE) 106. By virtue of wireless communication system 100, UE 106 may be enabled to carry out data communication with external data network 110, such as (but not limited to) the Internet.

RAN 104 may implement any suitable wireless communication technology or technologies to provide radio access to the UE 106. As one example, RAN 104 may operate according to 3rd Generation Partnership Project (3GPP) New Radio (NR) specifications, often referred to as 5G or 5G NR. In some examples, RAN 104 may operate under a hybrid of 5G NR and Evolved Universal Terrestrial Radio Access Network (eUTRAN) standards, often referred to as Long Term Evolution (LTE). 3GPP refers to this hybrid RAN as a next-generation RAN, or NG-RAN. Of course, many other examples may be utilized within the scope of the present disclosure.

As illustrated, RAN 104 includes a plurality of base stations 108. Broadly, a base station is a network element in a radio access network responsible for radio transmission and reception in one or more cells to or from a UE, such as UE 106. In different technologies, standards, or contexts, a base station may be referred to as a base transceiver station (BTS), a radio base station, a radio transceiver, a transceiver function, a basic service set (BSS), an extended service set (ESS), an access point (AP), a Node B (NB), an evolved Node B (eNB), a gNode B (gNB), a 5G NB, a serving cell, or other suitable terminology.

RAN 104 supports wireless communication for multiple mobile apparatuses, including UE 106. A mobile apparatus may be referred to as a UE, as in 3GPP specifications, or as a mobile station (MS), a subscriber station, a mobile unit, a subscriber unit, a wireless unit, a remote unit, a mobile device, a wireless device, a wireless communication device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides access to network services. A UE may take on many forms and can include a range of devices, such as smart phones/cellular telephones.

A mobile apparatus (aka a UE) need not necessarily have a capability to move, and need not be stationary. The term "mobile apparatus" or "mobile device" broadly refers to a diverse array of devices and technologies. UEs may include a number of hardware structural components sized, shaped, and arranged to help in communication. Such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT).

A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; and agricultural equipment; etc.

Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data. A mobile apparatus may additionally include two or more disaggregated devices in communication with one another, including, for example, a wearable device, a haptic sensor, a limb movement sensor, an eye movement sensor, etc., paired with a smartphone. In various examples, such disaggregated devices may communicate directly with one another over any suitable communication channel or interface, or may indirectly communicate with one another over a network (e.g., a local area network or LAN).

As illustrated in FIG. 1, base stations 108 may broadcast downlink traffic 112 to one or more UEs, such as UE 106. Broadly, base stations 108 are network nodes or devices responsible for scheduling traffic in a wireless communication network, including downlink traffic 112 and, in some examples, uplink traffic 116 from one or more UEs, such as UE 106, to base stations 108. On the other hand, UE 106 is a network node or device that receives downlink control information 114, including but not limited to scheduling information (e.g., a grant), synchronization or timing information, or other control information from another entity in the wireless communication network, such as base stations 108.

In general, base stations 108 may include a backhaul interface for communication with backhaul portion 120 of wireless communication system 100. Backhaul 120 may provide a link between base stations 108 and core network 102. Further, in some examples, a backhaul network may provide interconnection between base stations 108. Various types of backhaul interfaces may be employed, such as a direct physical connection, a virtual network, or the like, using any suitable transport network.

Core network 102 may be a part of wireless communication system 100, and may be independent of the radio access technology used in RAN 104. In some examples, core network 102 may be configured according to 5G standards (e.g., 5GC). In other examples, core network 102 may be configured according to a 4G evolved packet core (EPC), or any other suitable standard or configuration.

According to the techniques of this disclosure, one of base stations 108 may provide multiple cells or cell groups for UEs such as UE 106 to access. The one of base stations 108 may convey L1/L2 mobility trigger information to UE 106 in a MAC CE. The MAC CE may carry LTM related information for a cell switch, and UE 106 may use the LTM information to trigger a cell switch between the cells or cell groups provided by the one of base stations 108. The L1/L2 mobility trigger information of the MAC CE may contain a candidate configuration index, as well as other candidate information, such as, for example, transmission configuration indicator (TCI) state and/or SCell activation/deactivation information.

UE 106 and base stations 108 may be configured to support cell switching using random access channel (RACH) and/or RACH-less procedures. If UE 106 does not need to acquire timing advance (TA) during the cell switch, UE 106 may perform RACH-less cell switching. Radio resource control (RRC) configuration may provide RACH resources for contention-free RACH (CFRA) for L1/L2 dynamic switching. UE 106 may also provide information to the one of base stations 108 indicating that UE 106 will be switching to the target cell. Base stations 108 may reserve resources on the target cell for a certain period of time when UE 106 is expected to switch to the target cell from the current cell, e.g., in response to the LTM information provided by UE 106. Thus, UE 106 may also be configured with a timer for supervising an LTM cell switch, to coincide with the period of time for which the resources are reserved for the cell switch.

Furthermore, according to the techniques of this disclosure, base stations 108 may be configured to send configuration information 106 including one or more LTM conditions. When UE 106 determines that one or more of the LTM conditions has been met, UE 106 may execute or request LTM to the one of base stations 108 to which UE 106 is currently connected. According to the techniques of this disclosure, base stations 108 may configure conditional LTM between various candidate cells or cell groups. Such cells or cell groups may provide intra-DU and/or inter-DU cell switching. UE 106 may be configured to signal various information to the one of base stations 108 when performing UE-based LTM SpCell and cell group switching. For example, UE 106 may send information to a source cell to inform the source cell of a triggered conditional LTM switch or to the source cell to request a conditional LTM switch.

In addition, according to the techniques of this disclosure, the one of base stations 108 may send confirmation of receipt of the LTM request or execution to UE 106. For example, the one of base stations 108 may send the confirmation via the source cell and/or the target cell. Furthermore, this disclosure describes a timeline according to which such confirmation may be signaled.

Figure 2:
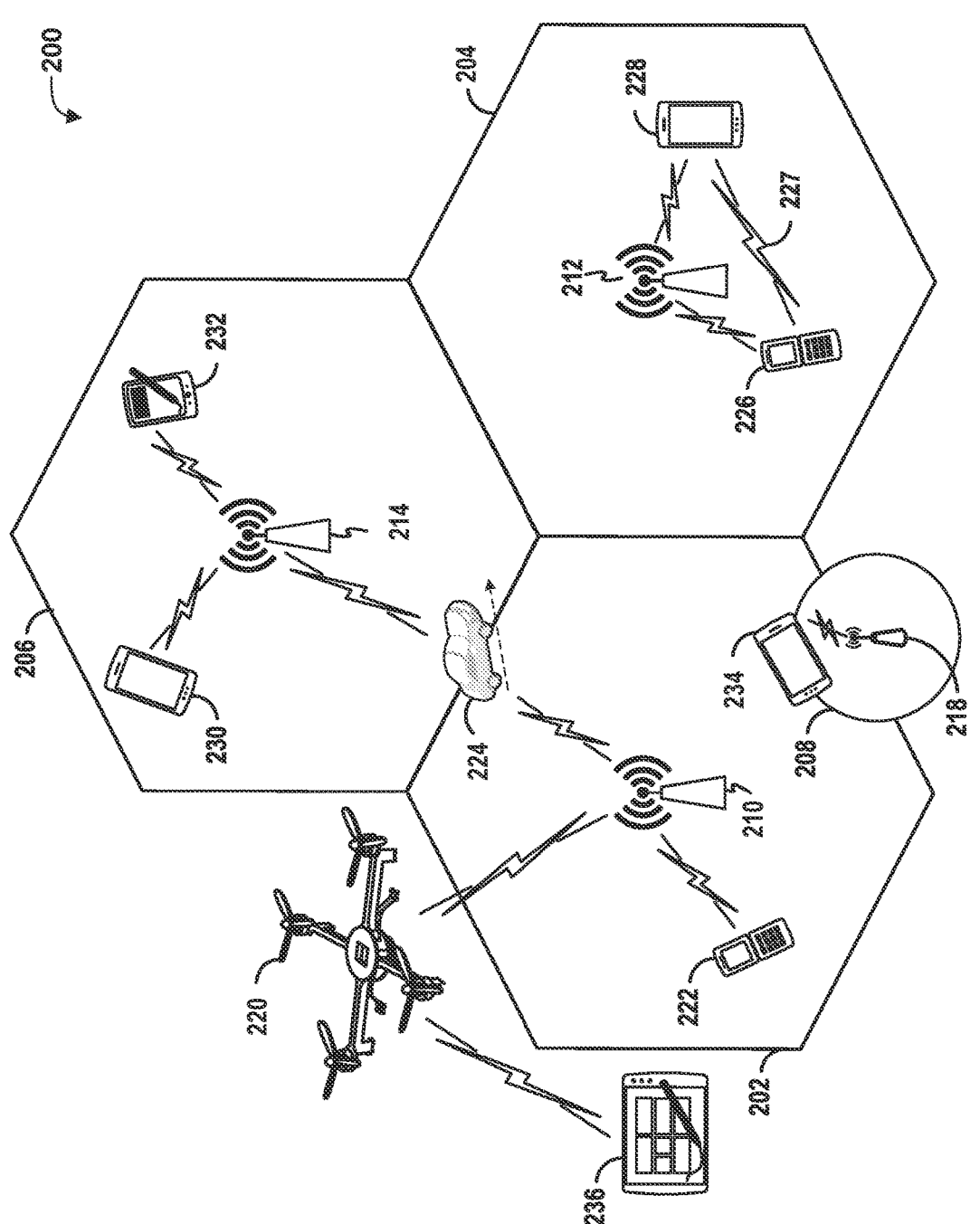
FIG. 2 is a conceptual illustration of an example of a radio access network according to some aspects of this disclosure.

FIG. 2 is a conceptual diagram illustrating an example RAN 200. RAN 200 may correspond to RAN 104 described above and illustrated in FIG. 1. That is, RAN 104 of FIG. 1 may include components similar to or identical to those of RAN 200 of FIG. 2. A geographic area covered by RAN 200 may be divided into cellular regions (cells) that a user equipment (UE) can uniquely identify based on an identification broadcasted from one base station. FIG. 2 illustrates macrocells 202, 204, and 206, and small cell 208.

FIG. 2 depicts base stations 210, 212, and 214 in cells 202, 204, and 206, respectively. In the example of FIG. 2, base stations 210, 212, and 214 support cells having a large size. Therefore, in this example, cells 202, 204, and 206 may be referred to as macrocells. Further, base station 218 is shown in small cell 208 (e.g., a microcell, picocell, femtocell, home base station, home Node B, home eNode B, etc.), which may overlap with one or more macrocells. In this example, base station 218 supports a cell having a relatively small size. Thus, cell 208 may be referred to as a small cell. Cell sizing can be determined according to system design and/or component constraints.

RAN 200 may include any number of wireless base stations and cells. Further, a RAN may include a relay node to extend the size or coverage area of a given cell. Base stations 210, 212, 214, 218 provide wireless access points to a core network for any number of mobile apparatuses. In some examples, base stations 210, 212, 214, and/or 218 may be the same as one of base stations 108 of FIG. 1.

FIG. 2 further includes drone 220, which may be configured to function as a base station. That is, in some examples, a cell need not necessarily be stationary, and the geographic area of the cell may move according to the location of a mobile base station such as drone 220.

Within RAN 200, each of base stations 210, 212, 214, 218, and 220 may be configured to provide an access point to core network 102 of FIG. 1 for all UEs in the respective cells. For example, UEs 222 and 224 may be in communication with the base station 210; UEs 226 and 228 may be in communication with the base station 212; UEs 230 and 232 may be in communication with the base station 214; UE 234 may be in communication with the base station 218; and UE 236 may be in communication with the mobile base station 220. In some examples, the UEs 222, 224, 226, 228, 230, 232, 234, and/or 236, may include components and perform functionality similar to those of UE 106 of FIG. 1.

In some examples, a mobile node (e.g., quadcopter 220) may be configured to function as a UE. For example, the quadcopter 220 may operate within cell 202 by communicating with base station 210.

The air interface in the RAN 200 may utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time utilizing a given resource. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

Figure 3:
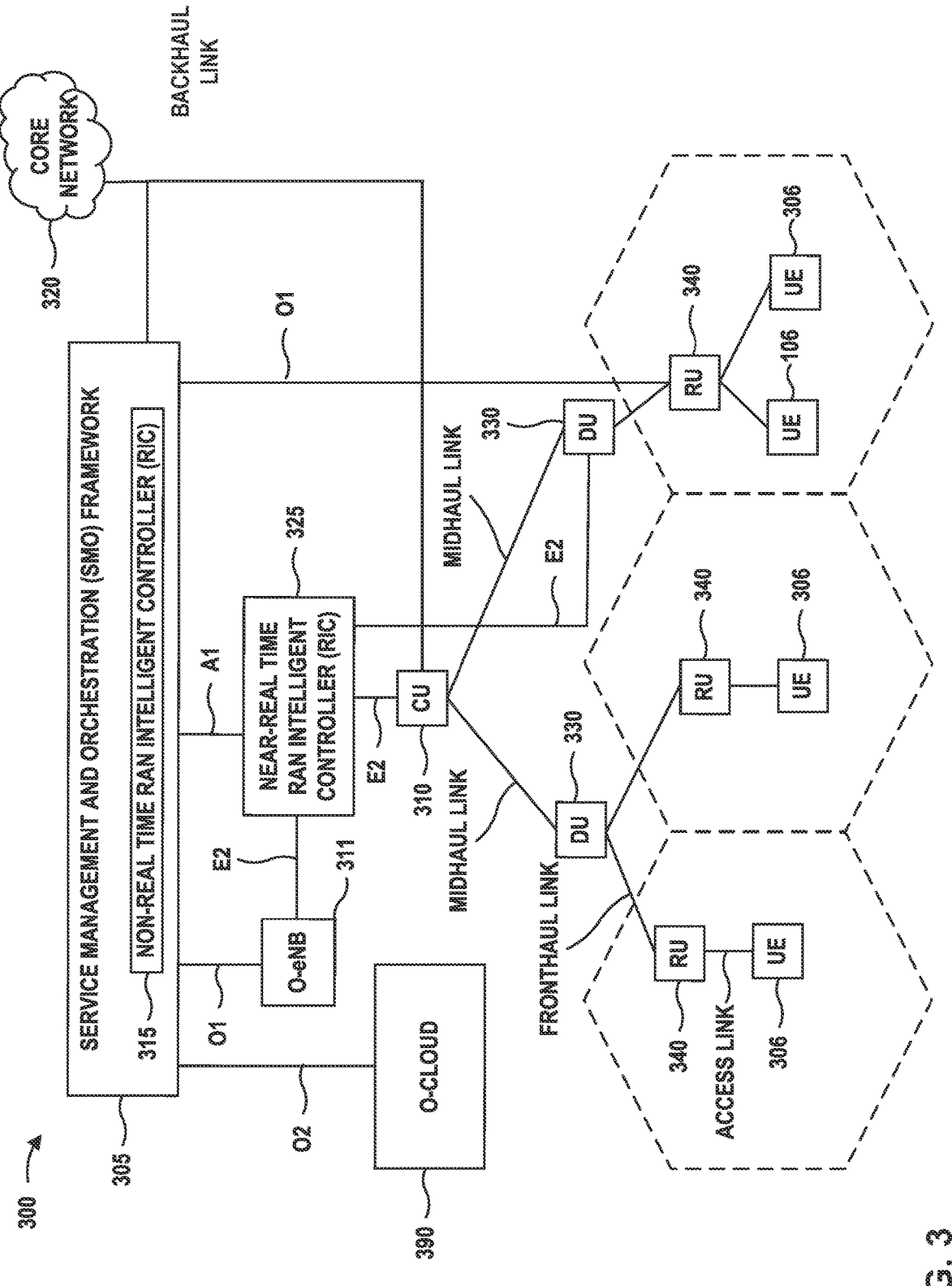
FIG. 3 is a schematic illustration of a distributed base station in an open radio access network architecture according to some aspects of this disclosure.

FIG. 3 is a conceptual diagram illustrating an example disaggregated base station 300 architecture. Disaggregated base station 300 architecture may include one or more central units (CUs) 310 that can communicate directly with core network 320 via a backhaul link, or indirectly with core network 320 through one or more disaggregated base station units (such as a Near-Real Time (Near-RT) RAN Intelligent Controller (RIC) 325 via an E2 link, or Non-Real Time (Non-RT) RIC 315 associated with a Service Management and Orchestration (SMO) Framework 305, or both). CU 310 may communicate with one or more distributed units (DUs) 330 via respective midhaul links, such as an F1 interface. DUs 330 may communicate with one or more radio units (RUs) 340 via respective fronthaul links. RUs 340 may communicate with respective UEs 306 via one or more radio frequency (RF) access links. In some implementations, UEs 306 may be simultaneously served by multiple RUs 340.

Each of the units, i.e., CUs 310, DUs 330, RUs 340, UEs 306, Near-RT RICs 325, Non-RT RICs 315, and SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by CU 310. CU 310 may be configured to handle user plane functionality (i.e., Central Unit-User Plane (CU-UP)), control plane functionality (i.e., Central Unit-Control Plane (CU-CP)), or a combination thereof. In some implementations, CU 310 can be logically split into one or more CU-UP units and one or more CU-CP units. The CU-UP unit can communicate bidirectionally with the CU-CP unit via an interface, such as the E1 interface when implemented in an O-RAN configuration. CU 310 can be implemented to communicate with DU 330, as necessary, for network control and signaling.

DU 330 may correspond to a logical unit that includes one or more base station functions to control the operation of one or more RUs 340. In some aspects, DU 330 may host one or more of a radio link control (RLC) layer, a medium access control (MAC) layer, and one or more high physical (PHY) layers (such as modules for forward error correction (FEC)

encoding and decoding, scrambling, modulation and demodulation, or the like) depending, at least in part, on a functional split, such as those defined by the 3rd Generation Partnership Project (3GPP). In some aspects, DU 330 may further host one or more low PHY layers. Each layer (or module) can be implemented with an interface configured to communicate signals with other layers (and modules) hosted by DU 330, or with the control functions hosted by CU 310.

Lower-layer functionality can be implemented by one or more RUs 340. In some deployments, RU 340, controlled by DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, RU(s) 340 can be implemented to handle over the air (OTA) communication with one or more UEs 306. In some implementations, real-time and non-real-time aspects of control and user plane communication with RU(s) 340 can be controlled by corresponding DU 330. In some scenarios, this configuration can enable DU(s) 330 and CU 310 to be implemented in a cloud-based RAN architecture, such as a vRAN architecture.

SMO Framework 305 may be configured to support RAN deployment and provisioning of non-virtualized and virtualized network elements. For non-virtualized network elements, SMO Framework 305 may be configured to support the deployment of dedicated physical resources for RAN coverage requirements which may be managed via an operations and maintenance interface (such as an O1 interface). For virtualized network elements, SMO Framework 305 may be configured to interact with a cloud computing platform (such as open cloud (O-Cloud) 390) to perform network element life cycle management (such as to instantiate virtualized network elements) via a cloud computing platform interface (such as O2 interface). Such virtualized network elements can include, but are not limited to, CUs 310, DUs 330, RUs 340 and Near-RT RICs 325. In some implementations, SMO Framework 305 can communicate with a hardware aspect of a 4G RAN, such as open eNB (O-CNB) 311, via an O1 interface. Additionally, in some implementations, SMO Framework 305 can communicate directly with one or more RUs 340 via an O1 interface. SMO Framework 305 also may include a Non-RT RIC 315 configured to support functionality of SMO Framework 305.

Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in Near-RT RIC 325. Non-RT RIC 315 may be coupled to or communicate with (such as via an A1 interface) Near-RT RIC 325. Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with Near-RT RIC 325.

In some implementations, to generate AI/ML models to be deployed in Near-RT RIC 325, Non-RT RIC 315 may receive parameters or external enrichment information from external servers. Such information may be utilized by Near-RT RIC 325 and may be received at SMO Framework 305 or Non-RT RIC 315 from non-network data sources or from network functions. In some examples, Non-RT RIC 315 or Near-RT RIC 325 may be configured to tune RAN behavior or performance. For example, Non-RT RIC 315 may monitor long-term trends and patterns for performance and employ AI/ML models to perform corrective actions through SMO Framework 305 (such as reconfiguration via O1) or via creation of RAN management policies (such as A1 policies).

Figure 4:
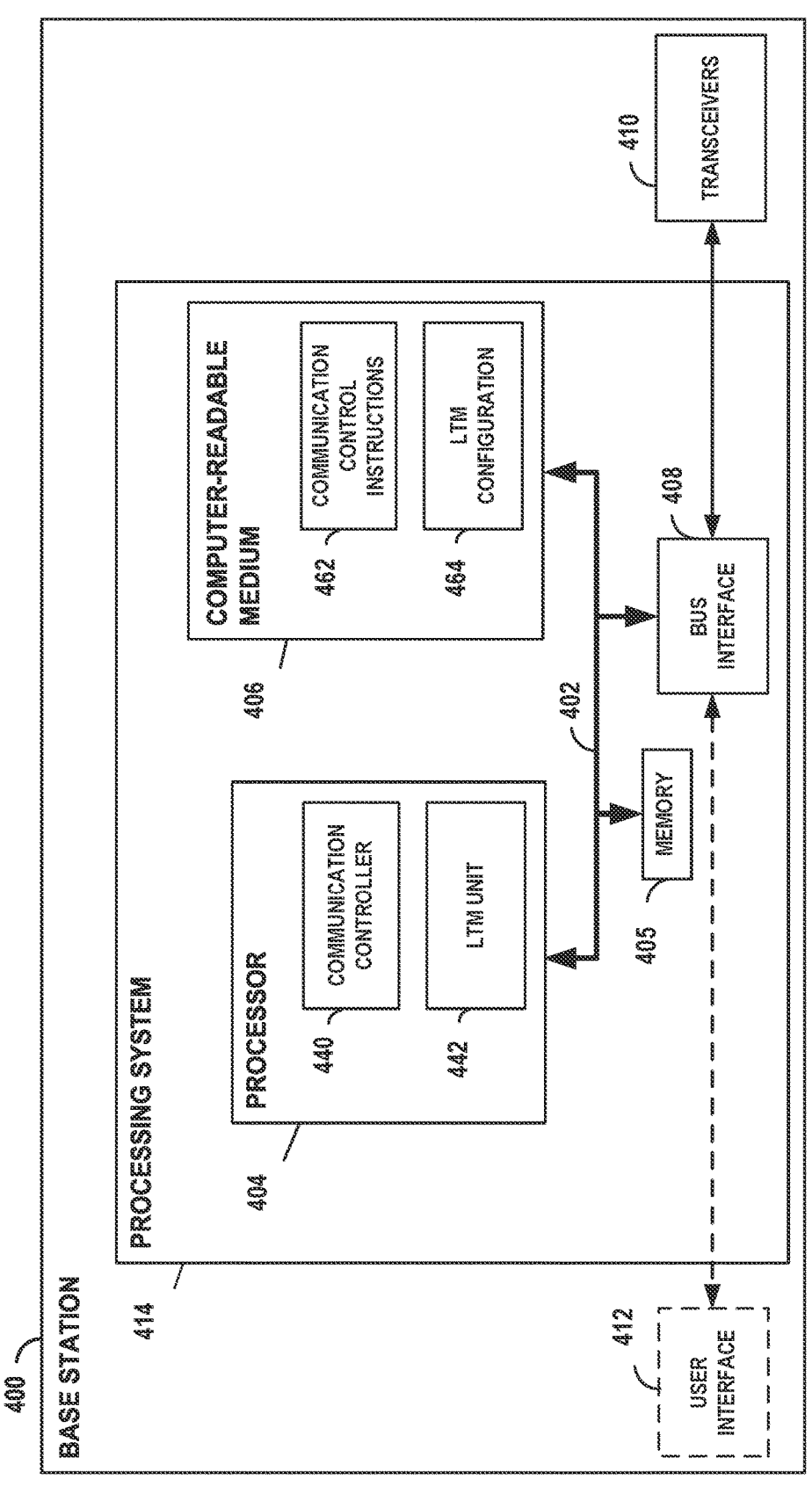
FIG. 4 is a block diagram illustrating an example hardware implementation of a base station employing a processing system.

FIG. 4 is a block diagram illustrating an example hardware implementation of base station 400 employing processing system 414. For example, base station 400 may be a base station as illustrated in any of FIGS. 1, 2, and/or 3.

Base station 400, which may also be referred to as a "network node," may include processing system 414 having one or more processors 404. Processors 404 may be implemented in circuitry. Examples of processors 404 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, base station 400 may be configured to perform any one or more of the functions described herein. For example, processor 404, as utilized in base station 400, may be configured (e.g., in coordination with memory 405) to implement any one or more of the processes and procedures described in this disclosure.

Processing system 414 may include a bus architecture, represented generally by bus 402. Bus 402 may include any number of interconnecting buses and bridges depending on the specific application of processing system 414 and the overall design constraints. Bus 402 communicatively couples together various circuits including one or more processors (represented generally by processor 404), memory 405, and computer-readable media (represented generally by computer-readable medium 406). Bus 402 may also link various other circuits such as timing sources, peripherals, voltage regulators, and power management circuits, which are well known in the art, and therefore, will not be described any further. Bus interface 408 provides an interface between bus 402 and transceivers 410. Transceivers 410 provide respective network interfaces, communication interfaces, or other means for communicating with various other apparatus over a transmission medium. Each of transceivers 410 may provide one or more cells or cell groups. For example, each of transceivers 410 may represent radio units (RUs) of base station 400, which may communicate with respective central units (CUs) and distributed units (DUs). Depending upon the nature of the apparatus, user interface 412 (e.g., keypad, display, speaker, microphone, and/or joystick) may also be provided. User interface 412 is optional, and some in examples, certain devices, such as a base station, may omit user interface 412.

In some examples, processor 404 may include communication controller 440 configured (e.g., in coordination with memory 405) for various functions, including, e.g., transmitting and/or receiving user data and/or control signaling to/from a wireless UE. Processor 404 is generally responsible for managing bus 402 and general processing, including the execution of software stored on computer-readable medium 406. The software, when executed by processor 404, causes processing system 414 to perform the various functions described below for any particular apparatus. Processor 404 may also use computer-readable medium 406 and memory 405 for storing data that processor 404 manipulates when executing software.

According to the techniques of this disclosure, processor 404 may execute L1/L2 triggered mobility (LTM) unit 442 to provide LTM configuration information 464 to another network node, such as a UE. For example, LTM configuration information 464 may include data representing one or more cells or cell groups provided by transceivers 410 for which LTM is enabled. Likewise, LTM configuration information 464 may indicate one or more conditions that, when triggered on a UE, may cause the UE to initiate or request LTM. As such, base station 400 may receive an indication or request of LTM (also referred to herein as "switch information") from the UE on the current cell and/or the target cell. Furthermore, LTM configuration information 464 may include instructions for causing base station 400 to confirm receipt of the LTM initiation received from the UE, e.g., via the current cell and/or the target cell.

In some examples, base station 400 may receive, and LTM unit 442 may process, switch information in the form of an indication that the UE will be switching from a current cell to a target cell. The "current cell" may instead be a current cell group, and likewise, the "target cell" may be a target cell group. Base station 400 may receive the switch information on the current cell or cell group, or on the target cell or cell group. The switch information may be a request to switch from the current cell or cell group to the target cell or cell group, or activation of a special cell (SpCell) or cell group. That is, base station 400 may receive a triggered switch to a new cell or cell group from a conditional cell group in response to triggered conditional LTM. This may include activation of the new SpCell or cell group from the LTM conditional cell or cell group. The switch information may be received as L1/L2 signaled information. Alternatively, the switch information may be a request received in the current serving cell or cell group to switch to a new SpCell or cell group from LTM candidate/conditional cell group. The request may be received as L1/L2 signaled information for the SpCell or cell group update received on the current serving cell.

LTM configuration information 464 may specify various conditional LTM triggers (or conditions). For example, one of the conditional LTM triggers may be measurements related to transmission signals. As an example, the measurements may relate to current or filtered measurements of channel quality, such as cell or beam quality, number of "good" beams, beam correlation, and/or maximum power extrapolation (MPE). In some examples, the measurements may relate to absolute or relative channel quality comparisons. Base station 400 may configure the UE to perform L1 measurement events of the current serving cell and one or more target cells (or cell groups).

Additionally or alternatively, the LTM triggers may specify radio link failure (RLF) as a condition to perform a switch to a new, target cell or cell group. Likewise, beam failure detection and/or beam failure recovery may represent LTM triggers. In some examples, an LTM trigger is activated based on reaching a specified threshold for beam failure indication (BFI) count on the primary cell (Pcell) before BFR is triggered.

Additionally or alternatively, the LTM triggers may relate to UE location and mobility information. For example, the UE location and mobility may be used in conjunction with cell location information, which may be delivered along with cell configuration information. In some examples, LTM unit 442 may configure the UE with one or more prediction algorithms to predict best candidate cells for L1/L2 mobility activation and new Pcell selection.

In some examples, base station 400 may receive switch information from a UE as L1/L2 information on the current serving cell for the UE to notify the current serving cell about the switch. In response to the notification, LTM unit 442 may reserve resources on the target cell for a period of time in expectation of the switch to the target cell. Alternatively, in some examples, the UE may directly go to the target cell, and in such cases, base station 400 may receive the switch information on the target cell from the UE, indicating that conditional LTM has been executed. Base station 400 may receive the switch information in the form of one or more of a scheduling request (SR), sounding reference signal (SRS) information, random access channel (RACH) information, or physical uplink shared channel (PUSCH) information. RACH information may be an LTM-specific message, and may be used in response to radio link failure. If the target cell is already a serving cell (e.g., in the case of a secondary cell to special cell switch), the UE may use newly defined L1/L2 signaling to notify the network about the switch. Such switch information signaling may be optimized to use the fact that the cell is already a serving cell.

In some examples, when base station 400 receives switch information on the source cell, the switch information may be uplink MAC CE information. Uplink L1 control signaling may be used to avoid scheduling delays that may occur when using uplink MAC CE information, even though this may limit the amount of information that can be conveyed. The signaling received from the UE may include any or all of a cell group or cell identifier (ID) to which the UE is to handover, beam information (e.g., TCI state(s)) the UE will use for access, additional configuration resources the UE will use when accessing the target cell, activation/deactivation state of the secondary cells, and/or timing information for when the UE will arrive on the target cell.

Furthermore, in some examples, the switch information may be conveyed as L1 information, e.g., uplink control information (UCI), or as L2 information, e.g., as MAC CE information. The switch information may include a bit to request LTM or a larger message, which may include information about the target cell or cell group, TCI state information, and/or timing information about when the UE will arrive on the target cell. Base station 400 may confirm receipt of the switch information on the source cell or, in some examples, may reject the request using L1/L2 signaling.

In some examples, base station 400 may confirm the switch information to the UE. For example, base station 400 may send confirmation of the receipt of conditional LTM signaling from the UE downlink on the source cell and/or on the target cell. When base station 400 sends the confirmation on the source cell, the UE may establish a switch (handover) timeline for UE LTM according to the confirmation reception. Otherwise, the timeline may be based on the time at which the UE sends the switch information.

In general, base station 400 may be configured with timing information representing a time at which the UE will be expected to arrive on the target cell. Thus, base station 400 may reserve resource for the UE associated with the target cell. If the UE does not arrive by the expected time, base station 400 may stop reserving those resources, such that other UEs can be served on the target cell. The time of arrival of the UE on the target cell may be based on a configured timer and/or processing time needed by the UE for confirmation of the conditional LTM signaling. Base station 400 may receive notification from the UE via resources of the target cell upon arrival of the UE on the target cell.

Base station 400 may send confirmation that the target cell is prepared for the UE and/or that the LTM UL MAC CE has been received from the UE based on signaling sent to the UE on the source cell. Base station 400 may receive downlink control information (DCI)-uplink scheduling for the source and/or target cell. Thus, no retransmission of a packet carrying the UL MAC CE is needed, but instead, a new transmission may be scheduled. The uplink grant may contain special information, such as the switch confirmation, where the grant may refer to the source cell or the target cell. Base station 400 may also send DCI-downlink scheduling information for the source and/or target cell. Such scheduling information may contain special information, such as the switch confirmation. One or more bits of the DCI indication may represent confirmation, and the DCI downlink scheduling information may also include a MAC CE within downlink data. Furthermore, the confirmation may be based on the explicit acknowledgement of the UL MAC CE reception, which may be a DCI-based acknowledgement (ACK).

Base station 400 may send confirmation that the target cell is prepared for the UE and/or that LTM UCI has been received based on signaling sent to the UE on the source cell. Such confirmation may include DCI information. The DCI may include a DCI-ACK representing an explicit acknowledgement of the LTM UCI reception. Moreover, the DCI scheduling downlink and/or uplink information may contain special information such as the switch confirmation, e.g., as one or more bits within the DCI indication confirmation and/or a MAC CE within the downlink. The grant may refer to the source cell (or cell group) and/or the target cell (or cell group).

Base station 400 may send confirmation that the target cell is prepared for the UE and/or that the LTM uplink signaling is received based on signaling sent to the UE on the target cell. Such confirmation may include DCI downlink and/or uplink scheduling for the target cell. The uplink grant may contain special information as the switch confirmation. The confirmation may be based on the explicit acknowledgement of the uplink MAC CE reception, e.g., a DCI-based ACK. To address an issue that may arise if the LTM uplink signaling is lost on the source cell but the UE switches to monitor the target cell, a timer may be defined within which the UE expects signaling on the target cell, and if the timer expires, the UE may be configured to go back to the source cell or perform LTM-specific RACH on the target cell.

One or more processors 404 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The software may reside on a computer-readable medium 406. The computer-readable medium 406 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. Additionally or alternatively, computer-readable medium 406 may be formed by any of a variety of memory devices, such as dynamic random access memory (DRAM), including synchronous DRAM (SDRAM), magnetoresistive RAM (MRAM), resistive RAM (RRAM), or other types of memory devices.

Computer-readable medium 406 may reside in processing system 414, external to processing system 414, or distributed across multiple entities including processing system 414. Computer-readable medium 406 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, computer-readable storage medium 406 may store computer-executable code that includes communication control instructions 462 that configure base station 400 for various functions, including, e.g., transmitting and/or receiving user data and/or control signaling to/from a wireless UE. Circuitry discussed above as being included in processor 404 is merely provided as an example, and other means for carrying out the described functions may be included within various aspects of the present disclosure, including but not limited to the instructions stored in computer-readable storage medium 406, or any other suitable apparatus or means described in any one of the FIGS. 1, 2, and/or 3.

In this manner, base station 400 represents an example of a first network entity for wireless communication including a communication interface; and one or more processors coupled to the communication interface, wherein the one or more processors are configured to: send configuration information to a second network entity, the configuration information specifying a condition to switch from a current cell to a target cell; exchange first information with the second network entity in the current cell via a communication session with the second network entity; receive, from the second network entity, switch information indicating that the second network entity will switch from the current cell to the target cell; in response to the information indicating that the second network entity will switch from the current cell to the target cell, send confirmation information confirming the switch to the second network entity; and exchange second information with the second network entity in the target cell via the communication session.

Likewise, base station 400 represents an example of a first network entity for wireless communication including a communication interface; and one or more processors coupled to the communication interface, wherein the one or more processors are configured to: send configuration information to a second network entity, the configuration information specifying a condition to switch from a current cell to a target cell; exchange first information with the second network entity in the current cell via a communication session with the second network entity; receive, from the second network entity, switch information representing that the condition has been met; and exchange second information with the second network entity in the target cell via the communication session.

Figure 5:
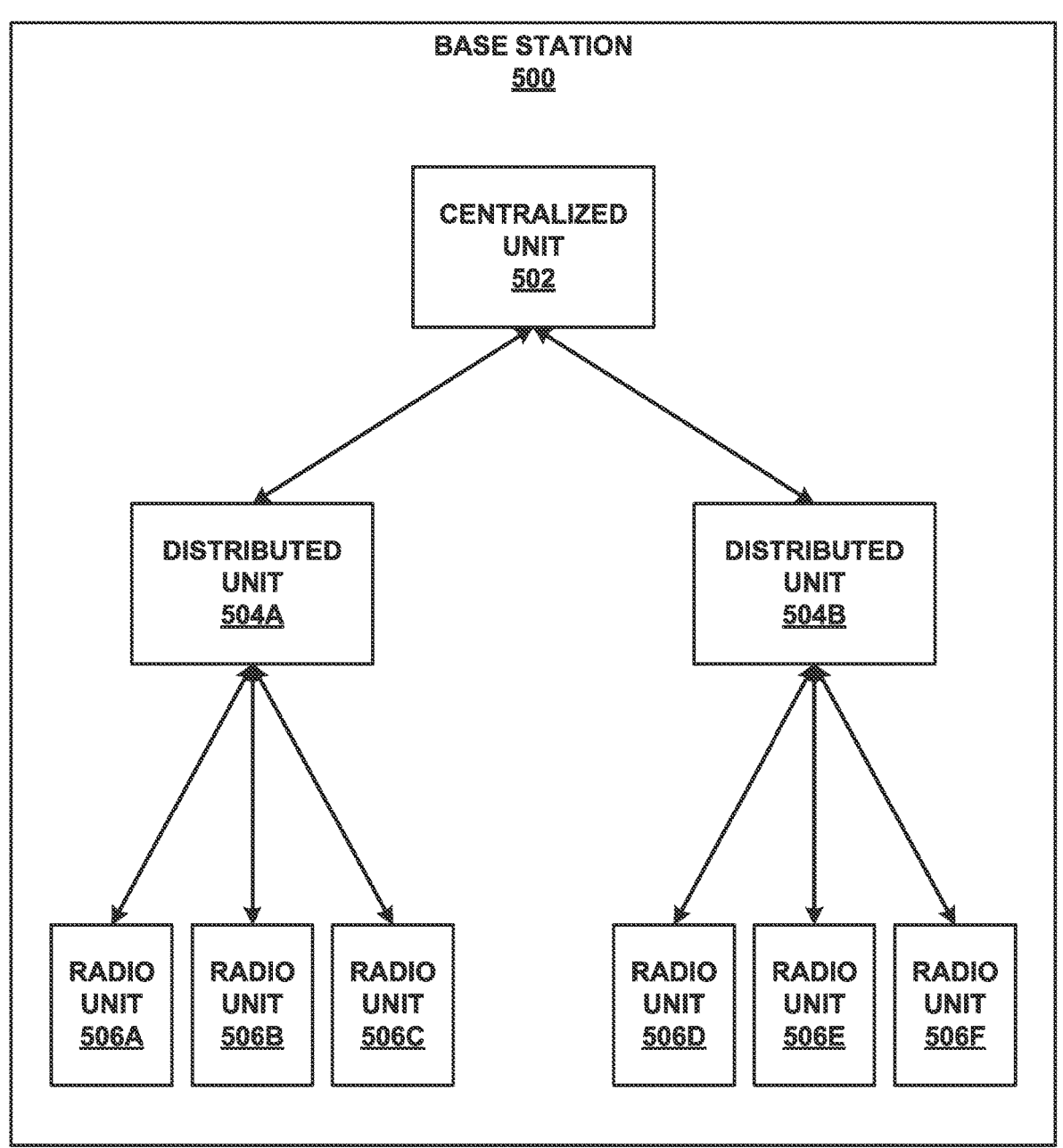
FIG. 5 is a block diagram illustrating an example set of transmission components of a base station.

FIG. 5 is a block diagram illustrating an example set of transmission components of base station 500. In general, base station 500 may include components similar to those of base station 400 of FIG. 4. In addition, as shown in FIG. 5, base station 500 includes centralized unit (CU) 502, distributed units (DUs) 504A, 504B, and radio units (RUS) 506A-506F. CU 502, DUs 504, and RUs 506 may generally correspond to transceivers 410 of FIG. 4.

In general, each of RUs 506 may process physical layer/L1 data in radio signals over cells or cell groups, and convert between such radio signals and digital signals for computer-based packet networks. Each of RUs may serve a particular cell or cell group, e.g., performing beam forming. As shown in FIG. 5, multiple RUs may communicate with a single DU. For example, DU 504A is communicatively coupled to each of RUs 506A-506C. Likewise, DU 504B is communicatively coupled to RUs 506D-506F. In practice, there may be more DUs and/or RUs for a given base station.

DUs 504 correspond to a distributed software unit. Each of DUs 504 may execute radio link controllers for respective RUs 504. DUs 504 may also process media access control (MAC)/L2 data, and in some cases, certain parts of the physical/L1 data.

CU 502 may provide user plane functions (UPFs), which may generally process network data at and above the network layer/L3. For example, CU 502 may perform routing and forwarding functions for packets sent to and from base station 500 via respective cells and/or via a backhaul, such as backhaul portion 120 of FIG. 1.

According to the techniques of this disclosure, a UE may perform LTM between cells or cell groups intra-DU or inter-DU and intra-CU. For example, a UE may perform LTM between a cell provided by RU 506A to a cell provided by RU 506C, which would be intra-DU, since both RU 506A and RU 506C are supported by the same DU, namely, DU 504A in this example. Likewise, a UE may perform LTM between a cell provided by RU 506A and a cell provided by RU 506D, which would be inter-DU intra-CU, since RU 506A is supported by DU 504A and RU 506D is supported by DU 506B, in this example.

In this manner, base station 500 represents an example of a first network entity for wireless communication including a communication interface; and one or more processors coupled to the communication interface, wherein the one or more processors are configured to: send configuration information to a second network entity, the configuration information specifying a condition to switch from a current cell to a target cell; exchange first information with the second network entity in the current cell via a communication session with the second network entity; receive, from the second network entity, switch information indicating that the second network entity will switch from the current cell to the target cell; in response to the information indicating that the second network entity will switch from the current cell to the target cell, send confirmation information confirming the switch to the second network entity; and exchange second information with the second network entity in the target cell via the communication session.

Likewise, base station 500 represents an example of a first network entity for wireless communication including a communication interface; and one or more processors coupled to the communication interface, wherein the one or more processors are configured to: send configuration information to a second network entity, the configuration information specifying a condition to switch from a current cell to a target cell; exchange first information with the second network entity in the current cell via a communication session with the second network entity; receive, from the second network entity, switch information representing that the condition has been met; and exchange second information with the second network entity in the target cell via the communication session.

Figure 6:
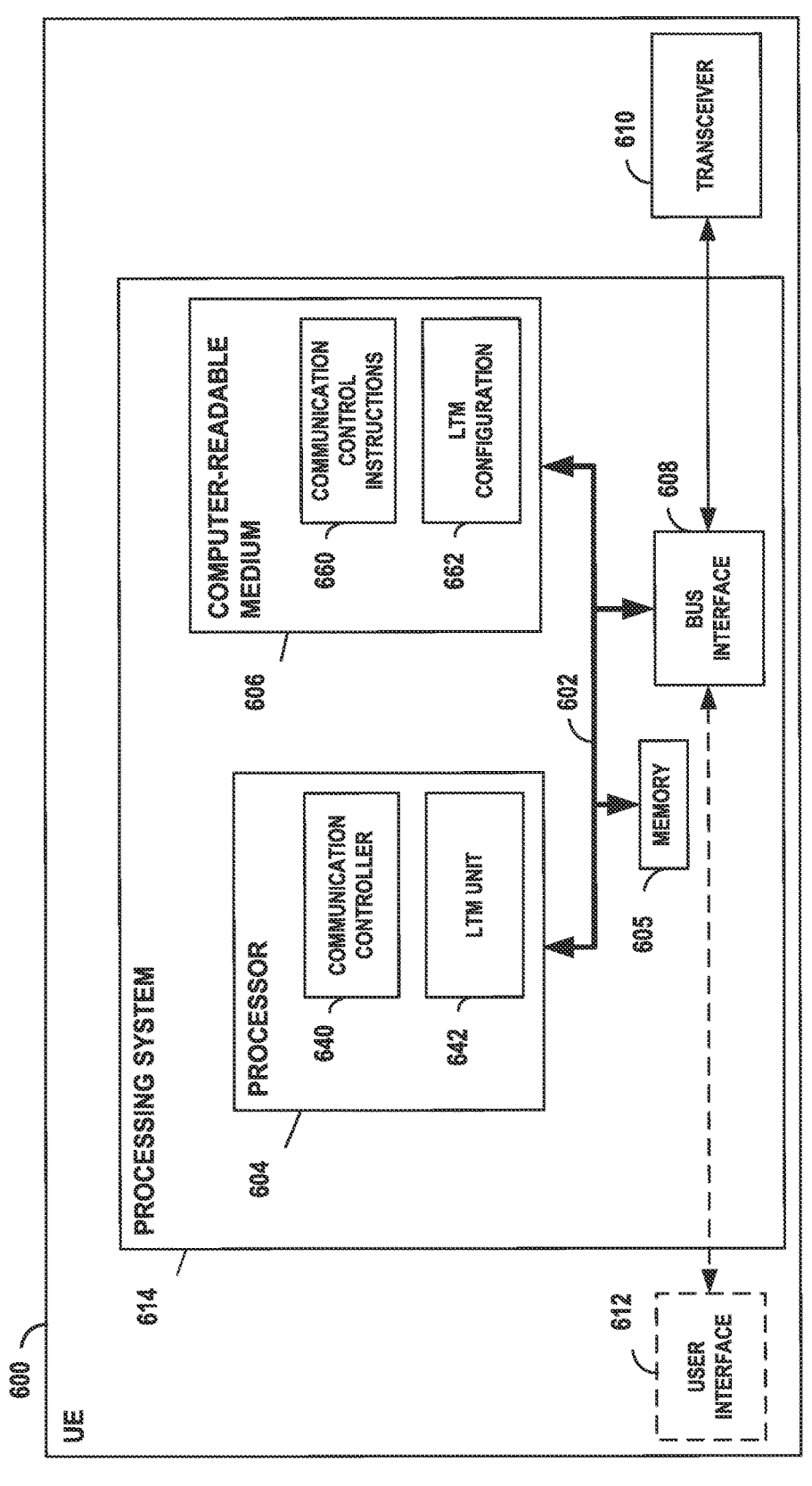
FIG. 6 is a block diagram illustrating an example hardware implementation of a user equipment (UE) employing a processing system.

FIG. 6 is a block diagram illustrating an example hardware implementation of an example UE 600 employing processing system 614. UE 600 may be referred to as a "network node." In some examples, a single device or network node may include functionality of both a UE and a base station as discussed with respect to FIGS. 4 and 6. In accordance with various aspects of this disclosure, processing system 614 may include an element, or any portion of an element, or any combination of elements, having one or more processors 604. For example, any of the various UE illustrated in and described with respect to FIGS. 1, 2, and/or 3 may include components similar to those of UE 600 of FIG. 6.

Processing system 614 may be substantially the same as processing system 414 of FIG. 4. In the example of FIG. 6, processing system 614 includes bus interface 608, bus 602, memory 605, processor 604, and computer-readable medium 606. Computer-readable medium 406 may be formed by any of a variety of memory devices, such as dynamic random access memory (DRAM), including synchronous DRAM (SDRAM), magnetoresistive RAM (MRAM), resistive RAM (RRAM), hard disks, flash memory, read only memory (ROM), or other types of memory devices. Furthermore, UE 600 may include user interface 612 and transceiver 610, which may be substantially similar to user interface 412 and transceiver 410 as described above with respect to FIG. 4.

In some examples, transceiver 610 may include multiple antenna panels, each such antenna panel having an associated local oscillator. However, transceiver 610 may include any suitable number of antenna panels. In further examples, transceiver 610 may include multiple power amplifiers that can be configured in accordance with the RRC parameter ptrs-Power. For example, transceiver 610 may include a plurality of power amplifiers that, in some examples, may be configured for a "small" or "large" functionality. Here, a "small" power amplifier configuration indicates that the full power that each power amplifier can generate is equal to the quantity: (full power for the UE power class)/(number of transmission layers). And a "large" power amplifier configuration indicates that the full power that each power amplifier can generate is equal to the full power for the UE's power class.

Processor 604, as utilized in UE 600, may be configured (e.g., in coordination with the memory 605) to implement any one or more of the techniques of this disclosure.

In some aspects of the disclosure, processor 604 may include communication controller 640 configured (e.g., in coordination with memory 605) for various functions, including, for example, transmitting and/or receiving user data and/or control signaling (including reference signals) to/from a base station.

Computer-readable storage medium 606 may store computer-executable code that includes communication control instructions 660 that configure UE 600 for various functions, including, e.g., transmitting and/or receiving user data and/or control signaling (including reference signals) to/from a base station. Computer-readable storage medium 606 may further store computer-executable code that includes transmission power boost instructions 662 that configure UE 600 for various functions.

Circuitry discussed with respect to processor 604 is merely provided as one example, and other means for carrying out the described functions may be included within various aspects of the present disclosure, including but not limited to the instructions stored in computer-readable storage medium 606, or any other suitable apparatus or means described in any one of FIGS. 1, 2, and/or 3.

According to the techniques of this disclosure, processor 604 may execute L1/L2 triggered mobility (LTM) unit 642 according to LTM configuration information 662, which UE 600 may receive from another network node, such as a base station. LTM configuration information 662 may include data representing one or more cells or cell groups provided by the other network node for which transceiver 610 may perform LTM. Likewise, LTM configuration information 662 may indicate one or more conditions that, when LTM unit 642 determines have occurred, may cause LTM unit 642 to initiate or request LTM. As such, UE 600 may send an indication or request of LTM (also referred to herein as "switch information") to the base station on the current cell and/or the target cell. Furthermore, LTM configuration information 662 may include instructions for causing UE 600 to receive confirmation of the LTM initiation received from the base station, e.g., via the current cell and/or the target cell.

In some examples, UE 600 may send switch information in the form of an indication to the base station that UE 600 will be switching from a current cell to a target cell. The "current cell" may instead be a current cell group, and likewise, the "target cell" may be a target cell group. UE 600 may send the switch information on the current cell or cell group, or on the target cell or cell group. The switch information may be a request to switch from the current cell or cell group to the target cell or cell group, or activation of a special cell (SpCell) or cell group. That is, UE 600 may send a triggered switch to a new cell or cell group from a conditional cell group in response to detecting triggered conditional LTM. This may include activation of the new SpCell or cell group from the LTM conditional cell or cell group. The switch information may be received as L1/L2 signaled information. Alternatively, the switch information may be a request received in the current serving cell or cell group to switch to a new SpCell or cell group from LTM candidate/conditional cell group. The request may be sent as L1/L2 signaled information for the SpCell or cell group update sent on the current serving cell.

LTM configuration information 662 may specify various conditional LTM triggers (or conditions). For example, one of the conditional LTM triggers may be measurements related to transmission signals. As an example, the measurements may relate to current or filtered measurements of channel quality, such as cell or beam quality, number of "good" beams, beam correlation, and/or maximum power extrapolation (MPE). In some examples, the measurements may relate to absolute or relative channel quality comparisons. LTM configuration information 662 may cause LTM unit 642 to perform L1 measurement events of the current serving cell and one or more target cells (or cell groups).

Additionally or alternatively, the LTM triggers may specify radio link failure (RLF) as a condition to perform a switch to a new, target cell or cell group. Likewise, beam failure detection and/or beam failure recovery may represent LTM triggers. In some examples, an LTM trigger is activated based on reaching a specified threshold for beam failure indication (BFI) count on the primary cell (Pcell) before BFR is triggered.

Additionally or alternatively, the LTM triggers may relate to UE location and mobility information. For example, the UE location and mobility may be used in conjunction with cell location information, which may be received along with cell configuration information. In some examples, LTM configuration information 662 may include one or more prediction algorithms to predict best candidate cells for L1/L2 mobility activation and new Pcell selection.

In some examples, UE 600 may send switch information to a base station as L1/L2 information on the current serving cell to notify the current serving cell about the switch. This notification may cause the base station to reserve resources on the target cell for a period of time in expectation of the switch to the target cell. Alternatively, in some examples, UE 600 may directly go to the target cell, and in such cases, UE 600 may send the switch information on the target cell to the base station, indicating that conditional LTM has been executed. UE 600 may send the switch information in the form of one or more of a scheduling request (SR), sounding reference signal (SRS) information, random access channel (RACH) information, or physical uplink shared channel (PUSCH) information. RACH information may be an LTM-specific message, and may be used in response to radio link failure. If the target cell is already a serving cell (e.g., in the case of a secondary cell to special cell switch), UE 600 may use newly defined L1/L2 signaling to notify the network about the switch. Such switch information signaling may be optimized to use the fact that the cell is already a serving cell.

In some examples, when UE 600 sends switch information on the source cell, the switch information may be uplink MAC CE information. Uplink L1 control signaling may be used to avoid scheduling delays that may occur when using uplink MAC CE information, even though this may limit the amount of information that can be conveyed. The signaling sent to the base station may include any or all of a cell group or cell identifier (ID) to which UE 600 is to handover, beam information (e.g., TCI state(s)) UE 600 will use for access, additional configuration resources UE 600 will use when accessing the target cell, activation/deactivation state of the secondary cells, and/or timing information for when UE 600 will arrive on the target cell.

Furthermore, in some examples, the switch information may be conveyed as L1 information, e.g., uplink control information (UCI), or as L2 information, e.g., as MAC CE information. The switch information may include a bit to request LTM or a larger message, which may include information about the target cell or cell group, TCI state information, and/or timing information about when the UE will arrive on the target cell. UE 600 may receive receipt confirmation of the switch information on the source cell or, in some examples, may receive a rejection of the request using L1/L2 signaling from the base station.

In some examples, UE 600 may receive confirmation of the switch information from the base station. For example, UE 600 may receive confirmation of the receipt of conditional LTM signaling from the UE downlink on the source cell and/or on the target cell. When UE 600 receives the confirmation on the source cell, UE 600 may establish a switch (handover) timeline for UE LTM according to the confirmation reception. Otherwise, the timeline may be based on the time at which UE 600 sends the switch information.

In general, LTM configuration information 662 may include timing information representing a time at which UE 600 will be expected to arrive on the target cell. The time of arrival of UE 600 on the target cell may be based on a configured timer and/or processing time needed by UE 600 for confirmation of the conditional LTM signaling. UE 600 may send the notification to the base station via resources of the target cell upon arrival of UE 600 on the target cell.

UE 600 may receive confirmation from the base station that the target cell is prepared for UE 600 and/or that the LTM UL MAC CE has been received from UE 600 based on signaling sent to UE 600 on the source cell. UE 600 may receive downlink control information (DCI)-uplink scheduling for the source and/or target cell. Thus, no retransmission of a packet carrying the UL MAC CE is needed, but instead, a new transmission may be scheduled. The uplink grant may contain special information, such as the switch confirmation, where the grant may refer to the source cell or the target cell. UE 600 may also receive DCI-downlink scheduling information for the source and/or target cell. Such scheduling information may contain special information, such as the switch confirmation. One or more bits of the DCI indication may represent confirmation, and the DCI downlink scheduling information may also include a MAC CE within downlink data. Furthermore, the confirmation may be based on the explicit acknowledgement of the UL MAC CE reception, which may be a DCI-based acknowledgement (ACK).

UE 600 may receive confirmation that the target cell is prepared for UE 600 and/or that LTM UCI has been received based on signaling sent to UE 600 on the source cell. Such confirmation may include DCI information. The DCI may include a DCI-ACK representing an explicit acknowledgement of the LTM UCI reception. Moreover, the DCI scheduling downlink and/or uplink information may contain special information such as the switch confirmation, e.g., as one or more bits within the DCI indication confirmation and/or a MAC CE within the downlink. The grant may refer to the source cell (or cell group) and/or the target cell (or cell group).

UE 600 may receive confirmation that the target cell is prepared for UE 600 and/or that the LTM uplink signaling is received based on signaling sent to UE 600 on the target cell. Such confirmation may include DCI downlink and/or uplink scheduling for the target cell. The uplink grant may contain special information as the switch confirmation. The confirmation may be based on the explicit acknowledgement of the uplink MAC CE reception, e.g., a DCI-based ACK. To address an issue that may arise if the LTM uplink signaling is lost on the source cell but UE 600 switches to monitor the target cell, a timer may be defined within which UE 600 expects signaling on the target cell, and if the timer expires, UE 600 may be configured to go back to the source cell or perform LTM-specific RACH on the target cell.

In this manner, UE 600 represents an example of a first network entity for wireless communication including: a communication interface; and one or more processors coupled to the communication interface, wherein the one or more processors are configured to: receive configuration information from a second network entity, the configuration information specifying a condition to switch from a current cell to a target cell; exchange first information with the second network entity in the current cell via a communication session with the second network entity; in response to the condition being met: send, to the second network entity, switch information indicating that the first network entity will switch from the current cell to the target cell; in response to the information indicating that the second network entity, receive, from the second network entity, confirmation information confirming the switch; and exchange second information with the second network entity in the target cell via the communication session.

Likewise, UE 600 represents an example of a first network entity for wireless communication including: a communication interface; and one or more processors coupled to the communication interface, wherein the one or more processors are configured to: receive configuration information from a second network entity, the configuration information specifying a condition to switch from a current cell to a target cell; exchange first information with the second network entity in the current cell via a communication session with the second network entity; in response to the condition being met: send, to the second network entity, switch information representing that the condition has been met; and exchange second information with the second network entity in the target cell via the communication session.

Figure 7:
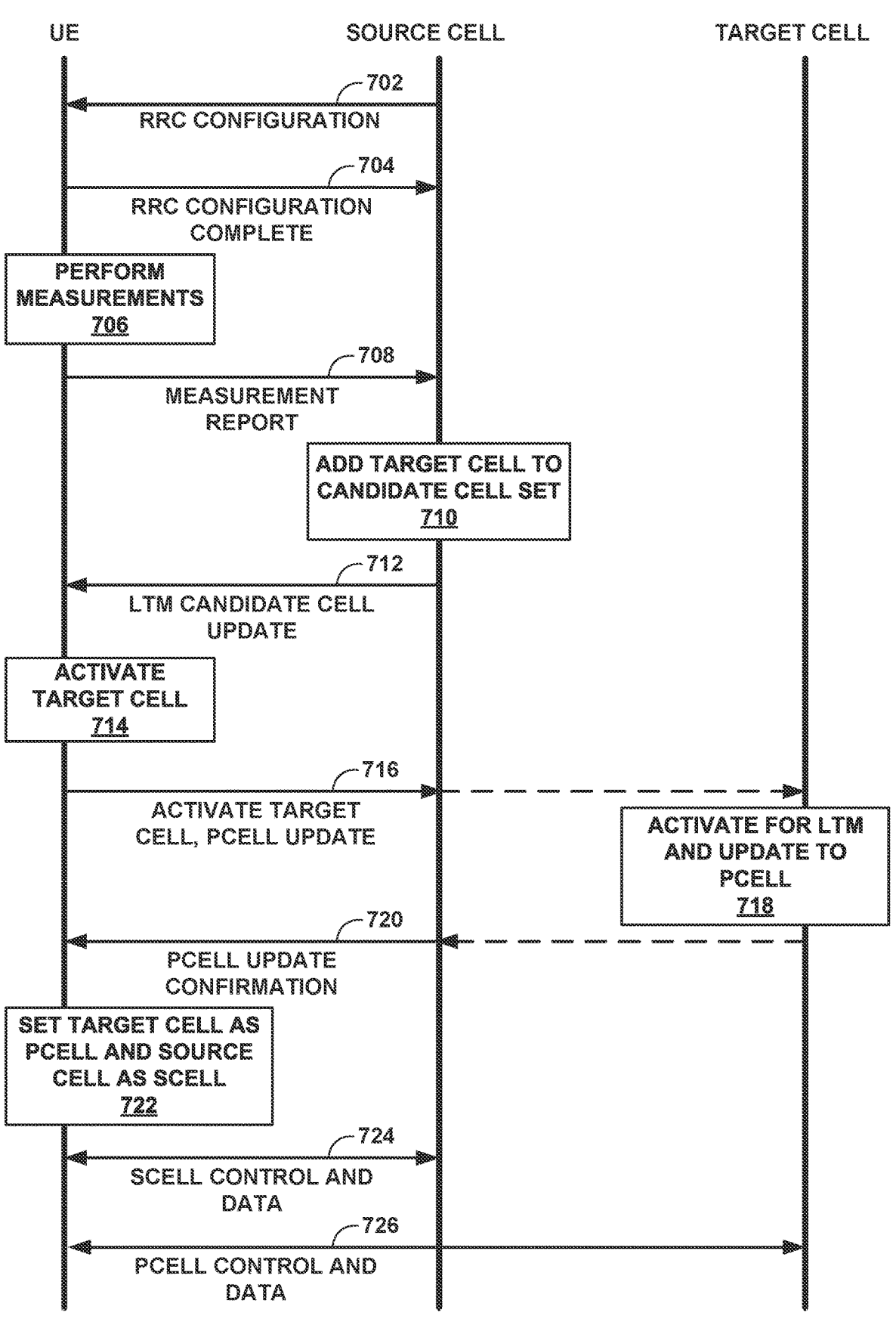
FIG. 7 is a flow diagram illustrating example actions performed by a UE, a source cell, and a target cell to support LTM according to various techniques of this disclosure.

FIG. 7 is a flow diagram illustrating example actions performed by a UE, a source cell, and a target cell to support LTM according to various techniques of this disclosure. In this example, the "source cell" and the "target cell" represent actions performed by, e.g., respective RUs and/or DUs of a common base station, such as base stations 400 and 500 of FIGS. 4 and 5. Similarly, the UE may correspond to UE 600 of FIG. 6.

Initially, the base station may configure some or all cells thereof as LTM candidate cells or cell groups and/or as conditional cells/cell groups. That is, these cells may be candidates for UE-triggered LTM, in response to the UE detecting that one or more conditions have occurred, thereby prompting the UE to perform LTM to move from the source cell to the target cell. In the case of inter-DU LTM, conditional cells or cell groups may be defined per DU. There may be multiple configured sets of conditional cells/cell groups. The UE may use the set of conditional cells including its source cell. This may ensure that the conditional LTM is executed within a DU. The conditions for performing LTM may include execution thresholds defined per set. The execution thresholds may be chosen depending on whether the conditional cell belongs to the same or different conditional cell/cell group set as the current source (serving) cell. This may provide bias toward intra-DU conditional LTM.

In the example of FIG. 7, initially, the UE receives radio resource control (RRC) configuration information from the source cell (702). The UE updates its configuration information and sends a message confirming that RRC configuration is complete (704). The configuration information may specify one or more conditions for performing LTM. Thus, the UE may perform measurements or other monitoring to determine whether the one or more conditions have been met (706). At times, the UE may send measurement reports to the base station on the source (serving) cell (708). These measurement reports may cause the base station to modify which cells are included in the set of conditional cells/cell groups (710). When a cell is added to the set of conditional cells/cell groups, the base station may send an LTM candidate cell update to the UE (712).

At some point, the UE may determine that one or more of the conditions for performing LTM has occurred (e.g., has triggered) (714). In response, the UE may send switch information indicating or requesting LTM to the base station, e.g., via the source cell and/or via the target cell (716), as discussed above. The base station may then activate the target cell for LTM and update the target cell to a primary cell (PCell) for the UE (718). The base station may then send a PCell update confirmation to the UE (720). In response, the UE may set the target cell as PCell and the current source cell as a secondary cell (SCell) (722). The UE may then proceed to exchange SCell control and data with the previous source cell as an SCell (724) and to exchange PCell control and data with the previous target cell as the new PCell (726).

Figure 8:
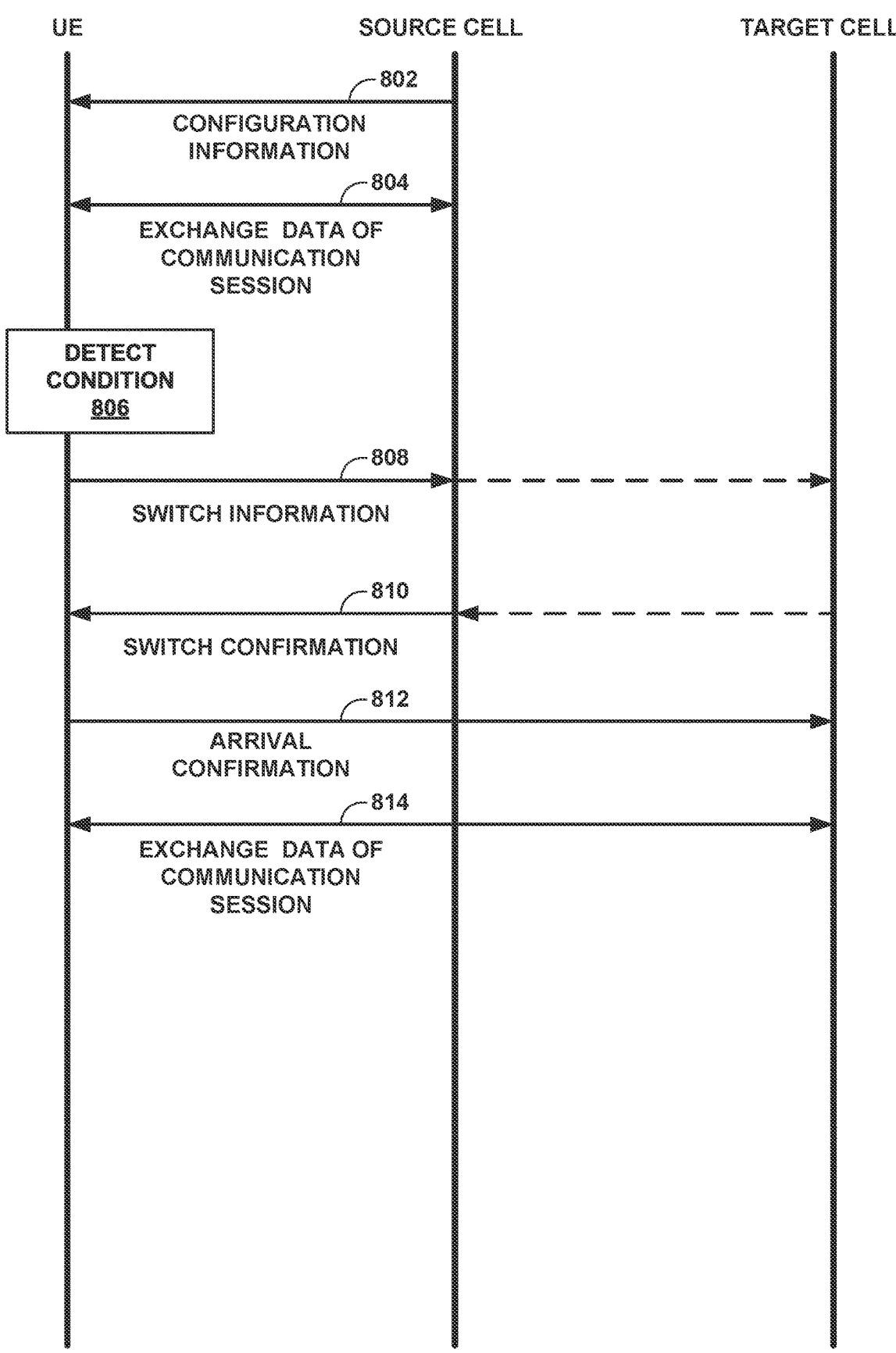
FIG. 8 is a flow diagram illustrating another example method for performing UE-initiated LTM according to techniques of this disclosure.

FIG. 8 is a flow diagram illustrating another example method for performing UE-initiated LTM according to techniques of this disclosure. The method of FIG. 8 may be performed by a UE, such as UE 600 of FIG. 6, and by a base station that provides multiple conditional LTM cells or cell groups, such as base station 400 of FIG. 4 and base station 500 of FIG. 5.

Initially, the UE may be configured to use the source cell of the base station as a primary cell or PCell. Thus, the base station may send, and the UE may receive, configuration information on the source cell (802). The configuration information may specify one or more conditions that, when met, indicate that the UE is to switch from the source (current) cell to the target cell. For example, such conditions may specify thresholds for measurements related to channel quality, cell quality, beam quality, number of "good" beams, beam correlation, maximum power extrapolation (MPE), or the like. The conditions may additionally or alternatively specify absolute or relative channel quality comparisons between cells, such as between the source cell and the target cell. In some cases, the conditions may relate to radio link failure, beam failure, beam failure recovery, UE location, and/or UE mobility.

The UE and the base station may also exchange data of a communication session on the source cell (804). At some point, the UE may detect that one or more of the specified conditions has been met (806). As such, the UE may send, and the base station may receive, switch information on the source and/or the target cell (808). The switch information may be one or more of a scheduling request (SR), sounding reference signal (SRS) information, random access channel (RACH) information, or physical uplink shared channel (PUSCH) information. In general, the switch information may indicate that the UE will switch to the target cell or be a request to switch to the target cell.

In response to the switch information, the base station may send, and the UE may receive, a switch confirmation, e.g., on the source cell and/or on the target cell (810). In some cases, the switch confirmation may indicate a time at which the UE is expected to arrive on the target cell. The base station may reserve resources on the target cell for the UE until the time at which the UE is expected to arrive as indicated in the switch confirmation. The base station may determine the time according to processing time required by the UE to process the confirmation information and/or to perform LTM. The confirmation information may be, for example, media access control (MAC)-layer control element (CE) confirmation information, which may include one or more bits of downlink control information (DCI). Additionally or alternatively, the confirmation information may be physical (PHY)-layer confirmation information, which may include downlink control information (DCI) acknowledgement information.

In some examples, the UE may send, and the base station may receive, an arrival confirmation on the target cell (812). The arrival confirmation generally indicates that the UE is now communicatively coupled to the base station via the target cell. The UE may then communicate via the target cell. In particular, the UE and the base station may exchange data of the same communication session as in step 804, but on the target cell instead of on the source cell (814).

In this manner, the method of FIG. 8 represents an example of a method of wireless communication performed by a first network entity, the method including sending configuration information to a second network entity, the configuration information specifying a condition to switch from a current cell to a target cell; exchanging first information with the second network entity in the current cell via a communication session with the second network entity; receiving, from the second network entity, switch information representing that the condition has been met; and exchanging second information with the second network entity in the target cell via the communication session.

Likewise, the method of FIG. 8 represents an example of a method of wireless communication performed by a first network entity, the method including receiving configuration information from a second network entity, the configuration information specifying a condition to switch from a current cell to a target cell; exchanging first information with the second network entity in the current cell via a communication session with the second network entity; in response to the condition being met: sending, to the second network entity, switch information representing that the condition has been met; and exchanging second information with the second network entity in the target cell via the communication session.

The method of FIG. 8 also represents an example of a method of wireless communication performed by a first network entity, the method including receiving configuration information from a second network entity, the configuration information specifying a condition to switch from a current cell to a target cell; exchanging first information with the second network entity in the current cell via a communication session with the second network entity; in response to the condition being met: sending, to the second network entity, switch information indicating that the first network entity will switch from the current cell to the target cell; in response to the information indicating that the second network entity, receiving, from the second network entity, confirmation information confirming the switch; and exchanging second information with the second network entity in the target cell via the communication session.

Furthermore, the method of FIG. 8 represents an example a method of wireless communication performed by a first network entity, the method including sending configuration information to a second network entity, the configuration information specifying a condition to switch from a current cell to a target cell; exchanging first information with the second network entity in the current cell via a communication session with the second network entity; receiving, from the second network entity, switch information indicating that the second network entity will switch from the current cell to the target cell; in response to the information indicating that the second network entity will switch from the current cell to the target cell, sending confirmation information confirming the switch to the second network entity; and exchanging second information with the second network entity in the target cell via the communication session.

Various examples of the techniques of this disclosure are summarized in the following clauses:

Clause 1: A first network entity for wireless communication comprising: a communication interface; and one or more processors coupled to the communication interface, wherein the one or more processors are configured to: send, via the communication interface, configuration information to a second network entity, the configuration information indicating a condition to switch from a current cell to a target cell; exchange first information with the second network entity on the current cell via a communication session with the second network entity; receive, from the second network entity via the communication interface, switch information indicating that the second network entity will switch from the current cell to the target cell based on the condition; send, via the communication interface, confirmation information to the second network entity, the confirmation information confirming that the second network entity will switch from the current cell to the target cell; and exchange, via the communication interface, second information of the communication session with the second network entity on the target cell.

Clause 2: The first network entity of clause 1, wherein to receive the switch information, the one or more processors are configured to receive the switch information on the current cell.

Clause 3: The first network entity of clause 1, wherein to receive the switch information, the one or more processors are configured to receive the switch information on the target cell.

Clause 4: The first network entity of clause 1, wherein to receive the switch information, the one or more processors are configured to receive a communication including the switch information, wherein the communication comprises one of a scheduling request (SR) communication, a sounding reference signal (SRS) communication, a random access channel (RACH) communication, or a physical uplink shared channel (PUSCH) communication.

Clause 5: The first network entity of clause 1, wherein the configuration information includes timing information indicating a time by which to switch to the target cell, and wherein to exchange the second information, the one or more processors are configured to exchange the second information according to the timing information.

Clause 6: The first network entity of clause 5, wherein the timing information is based on processing time required by the second network entity to process the confirmation information.

Clause 7: The first network entity of clause 5, wherein the one or more processors are configured to reserve resources associated with the target cell for the second network entity for a period of time according to the timing information after receipt of the switch information.

Clause 8: The first network entity of clause 8, wherein the one or more processors are configured to receive, via the communication interface, arrival confirmation information from the second network entity via the reserved resources associated with the target cell.

Clause 9: The first network entity of clause 5, wherein to send the confirmation information, the one or more processors are configured to send the confirmation information to the second network entity on the source cell via the communication interface, the confirmation information further including a time at which the confirmation information is sent, and wherein the timing information is relative to the time at which the conformation information is sent.

Clause 10: The first network entity of clause 1, wherein to send, via the communication interface, the confirmation information, the one or more processors are configured to send medium access control (MAC)-layer control element (CE) including the confirmation information.

Clause 11: The first network entity of clause 10, wherein to send, via the communication interface, the confirmation information, the one or more processors are configured to send, via the communication interface, one or more bits of downlink control information (DCI).

Clause 12: The first network entity of clause 1, wherein to receive, from the second network entity via the communication information, the switch information, the one or more processors are configured to send uplink control information (UCI) including the switch information.

Clause 13: The first network entity of clause 12, wherein to send, via the communication interface, the confirmation information, the one or more processors are configured to send, via the communication interface, downlink control information (DCI) including the confirmation information to the second network entity.

Clause 14: The first network entity of clause 1, wherein the communication interface comprises a radio unit (RU) associated with one of the current cell or the target cell.

Clause 15: The first network entity of clause 1, wherein the current cell and the target cell are associated with a common distributed unit (DU) of the first network entity.

Clause 16: The first network entity of clause 1, wherein the current cell is associated with a first distributed unit (DU) of the first network entity and the target cell is associated with a second, different DU of the first network entity.

Clause 17: A first network entity for wireless communication comprising: a communication interface; and one or more processors coupled to the communication interface, wherein the one or more processors are configured to: receive, via the communication interface, configuration information from a second network entity, the configuration information specifying a condition to switch from a current cell to a target cell; exchange, via the communication interface, first information of a communication session with the second network entity on the current cell; in response to the condition being met: send, to the second network entity via the communication interface, switch information indicating that the first network entity will switch from the current cell to the target cell; receive, from the second network entity via the communication interface, confirmation information confirming the switch; and exchange, via the communication interface, second information of the communication session with the second network entity on the target cell.

Clause 18: The first network entity of clause 17, wherein to send the switch information via the communication interface, the one or more processors are configured to send, via the communication interface, the switch information on the current cell.

Clause 19: The first network entity of clause 17, wherein to send the switch information via the communication interface, the one or more processors are configured to send the switch information via the communication interface on the target cell.

Clause 20: The first network entity of clause 17, wherein to send the switch information via the communication interface, the one or more processors are configured to send a communication including the switch information, the communication comprising one of a scheduling request (SR) communication, a sounding reference signal (SRS) communication, a random access channel (RACH) communication, or a physical uplink shared channel (PUSCH) communication.

Clause 21: The first network entity of clause 17, wherein the configuration information includes timing information indicating a time by which to switch to the target cell, and wherein to exchange the second information via the communication interface, the one or more processors are configured to exchange the second information according to the timing information.

Clause 22: The first network entity of clause 21, wherein the one or more processors are configured to send, via the communication interface, arrival confirmation information to the second network entity on the target cell.

Clause 23: The first network entity of clause 21, wherein to receive, from the second network entity via the communication interface, the confirmation information, the one or more processors are configured to receive, from the second network entity via the communication interface, the confirmation information from the second network entity on the source cell, the confirmation information including a time at which the confirmation information was sent, and wherein the timing information is relative to the time at which the conformation information was sent.

Clause 24: The first network entity of clause 17, wherein to receive, from the second network entity via the communication interface, the confirmation information, the one or more processors are configured to receive, from the second network entity via the communication interface, a medium access control (MAC)-layer control element (CE) including the confirmation information.

Clause 25: The first network entity of clause 17, wherein to receive, from the second network entity via the communication interface, the confirmation information, the one or more processors are configured to receive, from the second network entity via the communication interface, one or more bits of downlink control information (DCI).

Clause 26: The first network entity of clause 17, wherein to send, to the second network entity via the communication interface, the switch information, the one or more processors are configured to send, to the second network entity via the communication interface, uplink control information (UCI) including the switch information.

Clause 27: The first network entity of clause 17, wherein to receive, via the communication interface, the confirmation information, the one or more processors are configured to receive downlink control information (DCI) including the confirmation information.

Clause 28: The first network entity of clause 17, wherein the one or more processors are further configured to monitor the target cell before receiving the confirmation information.

Clause 29: A first network entity for wireless communication comprising: a communication interface; and one or more processors coupled to the communication interface, wherein the one or more processors are configured to: send, via the communication interface, configuration information to a second network entity, the configuration information indicating a condition to switch from a current cell to a target cell; exchange first information with the second network entity on the current cell via a communication session with the second network entity; receive, from the second network entity via the communication interface, switch information indicating that the second network entity will switch from the current cell to the target cell based on the condition; send, via the communication interface, confirmation information to the second network entity, the confirmation information confirming that the second network entity will switch from the current cell to the target cell; and exchange, via the communication interface, second information of the communication session with the second network entity on the target cell.

Clause 30: The first network entity of clause 29, wherein to receive the switch information, the one or more processors are configured to receive the switch information on the current cell.

Clause 31: The first network entity of clause 29, wherein to receive the switch information, the one or more processors are configured to receive the switch information on the target cell.

Clause 32: The first network entity of any of clauses 29-31, wherein to receive the switch information, the one or more processors are configured to receive a communication including the switch information, wherein the communication comprises one of a scheduling request (SR) communication, a sounding reference signal (SRS) communication, a random access channel (RACH) communication, or a physical uplink shared channel (PUSCH) communication.

Clause 33: The first network entity of any of clauses 29-32, wherein the configuration information includes timing information indicating a time by which to switch to the target cell, and wherein to exchange the second information, the one or more processors are configured to exchange the second information according to the timing information.

Clause 34: The first network entity of clause 33, wherein the timing information is based on processing time required by the second network entity to process the confirmation information.

Clause 35: The first network entity of any of clauses 33 and 34, wherein the one or more processors are configured to reserve resources associated with the target cell for the second network entity for a period of time according to the timing information after receipt of the switch information.

Clause 36: The first network entity of clause 35, wherein the one or more processors are configured to receive, via the communication interface, arrival confirmation information from the second network entity via the reserved resources associated with the target cell.

Clause 37: The first network entity of any of clauses 33-36, wherein to send, via the communication interface, the confirmation information, the one or more processors are configured to send, via the communication interface, the confirmation information to the second network entity on the source cell, the confirmation information further including a time at which the confirmation information is sent, and wherein the timing information is relative to the time at which the conformation information is sent.

Clause 38: The first network entity of any of clauses 33-37, wherein to send, via the communication interface, the confirmation information, the one or more processors are configured to send medium access control (MAC)-layer control element (CE) including the confirmation information.

Clause 39: The first network entity of clause 38, wherein to send, via the communication interface, the confirmation information, the one or more processors are configured to send, via the communication interface, one or more bits of downlink control information (DCI).

Clause 40: The first network entity of any of clauses 33-39, wherein to receive, from the second network entity via the communication information, the switch information, the one or more processors are configured to send uplink control information (UCI) including the switch information.

Clause 41: The first network entity of clause 40, wherein to send, via the communication interface, the confirmation information, the one or more processors are configured to send, via the communication interface, downlink control information (DCI) including the confirmation information to the second network entity.

Clause 42: The first network entity of any of clauses 33-41, wherein the communication interface comprises a radio unit (RU) associated with one of the current cell or the target cell.

Clause 43: The first network entity of any of clauses 33-42, wherein the current cell and the target cell are associated with a common distributed unit (DU) of the first network entity.

Clause 44: The first network entity of any of clauses 33-42, wherein the current cell is associated with a first distributed unit (DU) of the first network entity and the target cell is associated with a second, different DU of the first network entity.

Clause 45: A first network entity for wireless communication comprising: a communication interface; and one or more processors coupled to the communication interface, wherein the one or more processors are configured to: receive, via the communication interface, configuration information from a second network entity, the configuration information specifying a condition to switch from a current cell to a target cell; exchange, via the communication interface, first information of a communication session with the second network entity on the current cell; in response to the condition being met: send, to the second network entity via the communication interface, switch information indicating that the first network entity will switch from the current cell to the target cell; receive, from the second network entity via the communication interface, confirmation information confirming the switch; and exchange, via the communication interface, second information of the communication session with the second network entity on the target cell.

Clause 46: The first network entity of clause 45, wherein to send, via the communication interface, the switch information, the one or more processors are configured to send, via the communication interface, the switch information on the current cell.

Clause 47: The first network entity of clause 45, wherein to send, via the communication interface, the switch information, the one or more processors are configured to send, via the communication interface, the switch information on the target cell.

Clause 48: The first network entity of any of clauses 45-47, wherein to send, via the communication interface, the switch information, the one or more processors are configured to send, via the communication interface, a communication including the switch information, the communication comprising one of a scheduling request (SR) communication, a sounding reference signal (SRS) communication, a random access channel (RACH) communication, or a physical uplink shared channel (PUSCH) communication.

Clause 49: The first network entity of any of clauses 45-48, wherein the configuration information includes timing information indicating a time by which to switch to the target cell, and wherein to exchange the second information via the communication interface, the one or more processors are configured to exchange the second information according to the timing information.

Clause 50: The first network entity of clause 49, wherein the one or more processors are configured to send, via the communication interface, arrival confirmation information to the second network entity on the target cell.

Clause 51: The first network entity of any of clauses 49 and 50, wherein to receive, from the second network entity via the communication interface, the confirmation information, the one or more processors are configured to receive, from the second network entity via the communication interface, the confirmation information from the second network entity on the source cell, the confirmation information including a time at which the confirmation information was sent, and wherein the timing information is relative to the time at which the conformation information was sent.

Clause 52: The first network entity of any of clauses 45-51, wherein to receive, from the second network entity via the communication interface, the confirmation information, the one or more processors are configured to receive, from the second network entity via the communication interface, a medium access control (MAC)-layer control element (CE) including the confirmation information.

Clause 53: The first network entity of any of clauses 45-51, wherein to receive, from the second network entity via the communication interface, the confirmation information, the one or more processors are configured to receive, from the second network entity via the communication interface, one or more bits of downlink control information (DCI).

Clause 54: The first network entity of any of clauses 45-53, wherein to send, to the second network entity via the communication interface, the switch information, the one or more processors are configured to send, to the second network entity via the communication interface, uplink control information (UCI) including the switch information.

Clause 55: The first network entity of any of clauses 45-51, wherein to receive, via the communication interface, the confirmation information, the one or more processors are configured to receive downlink control information (DCI) including the confirmation information.

Clause 56: The first network entity of any of clauses 45-55, wherein the one or more processors are further configured to monitor the target cell before receiving the confirmation information.

Clause 57: A first network entity for wireless communication comprising: a communication interface; and one or more processors coupled to the communication interface, wherein the one or more processors are configured to: send, via the communication interface, configuration information to a second network entity, the configuration information specifying a condition to switch from a current cell to a target cell; exchange, via the communication interface, first information of a communication session with the second network entity on the current cell; receive, from the second network entity via the communication interface, switch information representing that the condition has been met; and exchange, via the communication interface, second information with the second network entity on the target cell via the communication session.

Clause 58: The first network entity of clause 57, wherein the configuration information indicates a candidate cell group including the target cell.

Clause 59: The first network entity of clause 57, wherein a distributed unit (DU) corresponds to the current cell and the target cell.

Clause 60: The first network entity of clause 57, wherein a first distributed unit (DU) corresponds to the current cell and a second, different DU corresponds to the target cell.

Clause 61: The first network entity of clause 57, wherein to receive, from the second network entity via the communication interface, the switch information, the one or more processors are configured to receive, from the second network entity via the communication interface, a communication including the switch information, the communication comprising one of a scheduling request (SR) communication, a sounding reference signal (SRS) communication, a random access channel (RACH) communication, or a physical uplink shared channel (PUSCH) communication.

Clause 62: The first network entity of clause 57, wherein to receive, from the second network entity via the communication interface, the switch information, the one or more processors are configured to receive, from the second network entity via the communication interface on the source cell, a request to switch to the target cell.

Clause 63: The first network entity of clause 57, wherein the condition includes one or more of measurements representing channel quality, radio link failure, beam failure recovery, beam failure detection, location of the second network entity, mobility of the second network entity, or full duplex capability of the target cell.

Clause 64: The first network entity of clause 57, wherein the switch information includes one or more of identification information for the target cell, transmission configuration indicator (TCI) state for a beam that the second network entity will use to access the target cell, resources the second network entity will use to access the target cell, activation or deactivation state information of the target cell, or time information indicating a time at which the second network entity will begin accessing the target cell.

Clause 65: The first network entity of clause 57, wherein the switch information comprises one of physical (PHY)-layer information or medium access control (MAC) information.

Clause 66: The first network entity of clause 57, wherein the switch information includes a request initiated by the second network entity for triggered mobility.

Clause 67: The first network entity of clause 57, wherein the one or more processors are further configured to send, to the second network entity via the communication interface, confirmation information to confirm the switch to the target cell.

Clause 68: The first network entity of clause 57, wherein the one or more processors are further configured to: send, via the communication interface, the configuration information to a third network entity; exchange, via the communication interface, fourth information of a second communication session with the third network entity; receive, via the communication interface, second switch information representing that the condition has been met for the third network entity; and send, to the third network entity via the communication interface, rejection information rejecting the second switch information.

Clause 69: The first network entity of clause 68, wherein to send, to the third network entity via the communication interface, the rejection information, the one or more processors are configured to send, to the third network entity via the communication interface, an explicit rejection message.

Clause 70: The first network entity of clause 68, wherein to send, to the third network entity via the communication interface, the rejection information, the one or more processors are configured to send, to the third network entity via the communication interface, a medium access control (MAC)-layer control element (CE) specifying a second, different target cell.

Clause 71: A first network entity for wireless communication comprising: a communication interface; and one or more processors coupled to the communication interface, wherein the one or more processors are configured to: receive, via the communication interface, configuration information from a second network entity, the configuration information specifying a condition to switch from a current cell to a target cell; exchange first information with the second network entity in the current cell via a communication session with the second network entity; in response to the condition being met: send, to the second network entity, switch information representing that the condition has been met; and exchange second information with the second network entity in the target cell via the communication session.

Clause 72: The first network entity of clause 71, wherein the configuration information specifies a candidate cell group including the target cell.

Clause 73: The first network entity of clause 71, wherein the configuration information specifies a plurality of candidate cell groups, at least one of the candidate cell groups including the source cell and the target cell.

Clause 74: The first network entity of clause 71, wherein the configuration information specifies a first candidate cell group including the source cell and a second, different candidate cell group including the target cell.

Clause 75: The first network entity of clause 71, wherein the switch information comprises one of a scheduling request (SR), sounding reference signal (SRS) information, random access channel (RACH) information, or physical uplink shared channel (PUSCH) information.

Clause 76: The first network entity of clause 71, wherein the switch information comprises a request, in the source cell, to switch to the target cell.

Clause 77: The first network entity of clause 71, wherein the condition includes one or more of measurements representing channel quality, radio link failure, beam failure recovery, beam failure detection, location of the first network entity, mobility of the first network entity, or full duplex capability of the target cell.

Clause 78: The first network entity of clause 71, wherein the one or more processors are further configured to determine that the condition has been met when one or more of measurements representing channel quality are below a threshold, detection of radio link failure, detection of beam failure, recovery from beam failure, determination that a location of the first network entity has entered or left a specified geographic area, determination of a movement speed of the first network entity, or detection of full duplex capability of the target cell.

Clause 79: The first network entity of clause 71, wherein the switch information includes one or more of identification information for the target cell, transmission configuration indicator (TCI) state for a beam that the first network entity will use to access the target cell, resources the first network entity will use to access the target cell, activation or deactivation state information of the target cell, or time information indicating a time at which the first network entity will begin accessing the target cell.

Clause 80: The first network entity of clause 71, wherein the switch information comprises one of physical (PHY)-layer information or media access control (MAC) information.

Clause 81: The first network entity of clause 71, wherein the switch information includes an indication that the switch information corresponds to a request initiated by the first network entity for triggered mobility.

Clause 82: The first network entity of clause 71, wherein the one or more processors are further configured to receive confirmation information from the second network entity confirming the switch to the target cell.

Clause 83: A first network entity for wireless communication comprising: a communication interface; and one or more processors coupled to the communication interface, wherein the one or more processors are configured to: send, via the communication interface, configuration information to a second network entity, the configuration information specifying a condition to switch from a current cell to a target cell; exchange, via the communication interface, first information of a communication session with the second network entity on the current cell; receive, from the second network entity via the communication interface, switch information representing that the condition has been met; and exchange, via the communication interface, second information with the second network entity on the target cell via the communication session.

Clause 84: The first network entity of clause 83, wherein the configuration information indicates a candidate cell group including the target cell.

Clause 85: The first network entity of any of clauses 83 and 84, wherein a distributed unit (DU) corresponds to the current cell and the target cell.

Clause 86: The first network entity of any of clauses 83 and 84, wherein a first distributed unit (DU) corresponds to the current cell and a second, different DU corresponds to the target cell.

Clause 87: The first network entity of any of clauses 83-86, wherein to receive, from the second network entity via the communication interface, the switch information, the one or more processors are configured to receive, from the second network entity via the communication interface, a communication including the switch information, the communication comprising one of a scheduling request (SR) communication, a sounding reference signal (SRS) communication, a random access channel (RACH) communication, or a physical uplink shared channel (PUSCH) communication.

Clause 88: The first network entity of any of clauses 83-86, wherein to receive, from the second network entity via the communication interface, the switch information, the one or more processors are configured to receive, from the second network entity via the communication interface on the source cell, a request to switch to the target cell.

Clause 89: The first network entity of any of clauses 83-88, wherein the condition includes one or more of measurements representing channel quality, radio link failure, beam failure recovery, beam failure detection, location of the second network entity, mobility of the second network entity, or full duplex capability of the target cell.

Clause 90: The first network entity of any of clauses 83-89, wherein the switch information includes one or more of identification information for the target cell, transmission configuration indicator (TCI) state for a beam that the second network entity will use to access the target cell, resources the second network entity will use to access the target cell, activation or deactivation state information of the target cell, or time information indicating a time at which the second network entity will begin accessing the target cell.

Clause 91: The first network entity of any of clauses 83-90, wherein the switch information comprises one of physical (PHY)-layer information or medium access control (MAC) information.

Clause 92: The first network entity of any of clauses 83-91, wherein the switch information includes a request initiated by the second network entity for triggered mobility.

Clause 93: The first network entity of any of clauses 83-92, wherein the one or more processors are further configured to send, to the second network entity via the communication interface, confirmation information to confirm the switch to the target cell.

Clause 94: The first network entity of any of clauses 83-93, wherein the one or more processors are further configured to: send, via the communication interface, the configuration information to a third network entity; exchange, via the communication interface, fourth information of a second communication session with the third network entity; receive, via the communication interface, second switch information representing that the condition has been met for the third network entity; and send, to the third network entity via the communication interface, rejection information rejecting the second switch information.

Clause 95: The first network entity of clause 94, wherein to send, to the third network entity via the communication interface, the rejection information, the one or more processors are configured to send, to the third network entity via the communication interface, an explicit rejection message.

Clause 96: The first network entity of clause 94, wherein to send, to the third network entity via the communication interface, the rejection information, the one or more processors are configured to send, to the third network entity via the communication interface, a medium access control (MAC)-layer control element (CE) specifying a second, different target cell.

Clause 97: A first network entity for wireless communication comprising: a communication interface; and one or more processors coupled to the communication interface, wherein the one or more processors are configured to: receive, via the communication interface, configuration information from a second network entity, the configuration information specifying a condition to switch from a current cell to a target cell; exchange first information with the second network entity in the current cell via a communication session with the second network entity; in response to the condition being met: send, to the second network entity, switch information representing that the condition has been met; and exchange second information with the second network entity in the target cell via the communication session.

Clause 98: The first network entity of clause 97, wherein the configuration information specifies a candidate cell group including the target cell.

Clause 99: The first network entity of clause 97, wherein the configuration information specifies a plurality of candidate cell groups, at least one of the candidate cell groups including the source cell and the target cell.

Clause 100: The first network entity of any of clauses 97-99, wherein the configuration information specifies a first candidate cell group including the source cell and a second, different candidate cell group including the target cell.

Clause 101: The first network entity of any of clauses 97-100, wherein the switch information comprises one of a scheduling request (SR), sounding reference signal (SRS) information, random access channel (RACH) information, or physical uplink shared channel (PUSCH) information.

Clause 102: The first network entity of any of clauses 97-101, wherein the switch information comprises a request, in the source cell, to switch to the target cell.

Clause 103: The first network entity of any of clauses 97-102, wherein the condition includes one or more of measurements representing channel quality, radio link failure, beam failure recovery, beam failure detection, location of the first network entity, mobility of the first network entity, or full duplex capability of the target cell.

Clause 104: The first network entity of any of clauses 97-103, wherein the one or more processors are further configured to determine that the condition has been met when one or more of measurements representing channel quality are below a threshold, detection of radio link failure, detection of beam failure, recovery from beam failure, determination that a location of the first network entity has entered or left a specified geographic area, determination of a movement speed of the first network entity, or detection of full duplex capability of the target cell.

Clause 105: The first network entity of any of clauses 97-104, wherein the switch information includes one or more of identification information for the target cell, transmission configuration indicator (TCI) state for a beam that the first network entity will use to access the target cell, resources the first network entity will use to access the target cell, activation or deactivation state information of the target cell, or time information indicating a time at which the first network entity will begin accessing the target cell.

Clause 106: The first network entity of any of clauses 97-105, wherein the switch information comprises one of physical (PHY)-layer information or media access control (MAC) information.

Clause 107: The first network entity of any of clauses 97-106, wherein the switch information includes an indication that the switch information corresponds to a request initiated by the first network entity for triggered mobility.

Clause 108: The first network entity of any of clauses 97-107, wherein the one or more processors are further configured to receive confirmation information from the second network entity confirming the switch to the target cell.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and micro-wave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A first network entity for wireless communication comprising:
   a communication interface; and
   one or more processors coupled to the communication interface, wherein the one or more processors are configured to:
      send, via the communication interface, configuration information to a second network entity, the configuration information specifying a condition to switch from a current cell to a target cell;
      exchange, via the communication interface, first information of a communication session with the second network entity on the current cell;
      receive, from the second network entity via the communication interface, switch information representing that the condition has been met; and
      exchange, via the communication interface, second information with the second network entity on the target cell via the communication session.

2. The first network entity of claim 1, wherein the configuration information indicates a candidate cell group including the target cell.

3. The first network entity of claim 1, wherein a distributed unit (DU) corresponds to the current cell and the target cell.

4. The first network entity of claim 1, wherein a first distributed unit (DU) corresponds to the current cell and a second, different DU corresponds to the target cell.

5. The first network entity of claim 1, wherein to receive, from the second network entity via the communication interface, the switch information, the one or more processors are configured to receive, from the second network entity via the communication interface, a communication including the switch information, the communication comprising one of a scheduling request (SR) communication, a sounding reference signal (SRS) communication, a random access channel (RACH) communication, or a physical uplink shared channel (PUSCH) communication.

6. The first network entity of claim 1, wherein to receive, from the second network entity via the communication interface, the switch information, the one or more processors are configured to receive, from the second network entity via the communication interface on the source cell, a request to switch to the target cell.

7. The first network entity of claim 1, wherein the condition includes one or more of measurements representing channel quality, radio link failure, beam failure recovery, beam failure detection, location of the second network entity, mobility of the second network entity, or full duplex capability of the target cell.

8. The first network entity of claim 1, wherein the switch information includes one or more of identification information for the target cell, transmission configuration indicator (TCI) state for a beam that the second network entity will use to access the target cell, resources the second network entity will use to access the target cell, activation or deactivation state information of the target cell, or time information indicating a time at which the second network entity will begin accessing the target cell.

9. The first network entity of claim 1, wherein the switch information comprises one of physical (PHY)-layer information or medium access control (MAC) information.

10. The first network entity of claim 1, wherein the switch information includes a request initiated by the second network entity for triggered mobility.

11. The first network entity of claim 1, wherein the one or more processors are further configured to send, to the second network entity via the communication interface, confirmation information to confirm the switch to the target cell.

12. The first network entity of claim 1, wherein the one or more processors are further configured to:
   send, via the communication interface, the configuration information to a third network entity;
   exchange, via the communication interface, fourth information of a second communication session with the third network entity;
   receive, via the communication interface, second switch information representing that the condition has been met for the third network entity; and
   send, to the third network entity via the communication interface, rejection information rejecting the second switch information.

13. The first network entity of claim 12, wherein to send, to the third network entity via the communication interface, the rejection information, the one or more processors are configured to send, to the third network entity via the communication interface, an explicit rejection message.

14. The first network entity of claim 12, wherein to send, to the third network entity via the communication interface, the rejection information, the one or more processors are configured to send, to the third network entity via the communication interface, a medium access control (MAC)-layer control element (CE) specifying a second, different target cell.

15. A first network entity for wireless communication comprising:

a communication interface; and one or more processors coupled to the communication interface, wherein the one or more processors are configured to:

receive, via the communication interface, configuration information from a second network entity, the configuration information specifying a condition to switch from a current cell to a target cell;

exchange first information with the second network entity in the current cell via a communication session with the second network entity;

in response to the condition being met:

send, to the second network entity, switch information representing that the condition has been met; and exchange second information with the second network entity in the target cell via the communication session.

16. The first network entity of claim 15, wherein the configuration information specifies a candidate cell group including the target cell.

17. The first network entity of claim 15, wherein the configuration information specifies a plurality of candidate cell groups, at least one of the candidate cell groups including the source cell and the target cell.

18. The first network entity of claim 15, wherein the configuration information specifies a first candidate cell group including the source cell and a second, different candidate cell group including the target cell.

19. The first network entity of claim 15, wherein the switch information comprises one of a scheduling request (SR), sounding reference signal (SRS) information, random access channel (RACH) information, or physical uplink shared channel (PUSCH) information.

20. The first network entity of claim 15, wherein the switch information comprises a request, in the source cell, to switch to the target cell.

21. The first network entity of claim 15, wherein the condition includes one or more of measurements representing channel quality, radio link failure, beam failure recovery, beam failure detection, location of the first network entity, mobility of the first network entity, or full duplex capability of the target cell.

22. The first network entity of claim 15, wherein the one or more processors are further configured to determine that the condition has been met when one or more of measurements representing channel quality are below a threshold, detection of radio link failure, detection of beam failure, recovery from beam failure, determination that a location of the first network entity has entered or left a specified geographic area, determination of a movement speed of the first network entity, or detection of full duplex capability of the target cell.

23. The first network entity of claim 15, wherein the switch information includes one or more of identification information for the target cell, transmission configuration indicator (TCI) state for a beam that the first network entity will use to access the target cell, resources the first network entity will use to access the target cell, activation or deactivation state information of the target cell, or time information indicating a time at which the first network entity will begin accessing the target cell.

24. The first network entity of claim 15, wherein the switch information comprises one of physical (PHY)-layer information or media access control (MAC) information.

25. The first network entity of claim 15, wherein the switch information includes an indication that the switch information corresponds to a request initiated by the first network entity for triggered mobility.

26. The first network entity of claim 15, wherein the one or more processors are further configured to receive confirmation information from the second network entity confirming the switch to the target cell.

* * * * *